(12) United States Patent
Kiyama et al.

(10) Patent No.: US 10,956,147 B2
(45) Date of Patent: Mar. 23, 2021

(54) SOFTWARE DISTRIBUTION SYSTEM, SOFTWARE DISTRIBUTION SERVER, AND SOFTWARE DISTRIBUTION METHOD

(71) Applicant: HITACHI, LTD., Tokyo (JP)

(72) Inventors: Noboru Kiyama, Tokyo (JP); Atsushi Katou, Tokyo (JP); Naomi Izumi, Tokyo (JP); Haruki Oishi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 2 days.

(21) Appl. No.: 16/528,109

(22) Filed: Jul. 31, 2019

(65) Prior Publication Data

US 2020/0042306 A1 Feb. 6, 2020

(30) Foreign Application Priority Data

Aug. 2, 2018 (JP) .............................. JP2018-146333

(51) Int. Cl.
*G06F 11/36* (2006.01)
*G06F 8/65* (2018.01)
*G06F 11/32* (2006.01)
*H04L 29/08* (2006.01)

(52) U.S. Cl.
CPC .............. *G06F 8/65* (2013.01); *G06F 11/327* (2013.01); *H04L 67/34* (2013.01)

(58) Field of Classification Search
CPC ...... G06F 8/65; G06F 11/327; G06F 11/3684; G06F 11/3672; H04L 67/34; H04L 43/50
See application file for complete search history.

(56) References Cited

U.S. PATENT DOCUMENTS

| 9,201,804 B1 * | 12/2015 | Egyed ................. G06F 12/0871 |
| 2012/0174087 A1 * | 7/2012 | Bentzien .................. G06F 8/65 |
| | | 717/169 |
| 2012/0323402 A1 | 12/2012 | Murakami |
| 2014/0075197 A1 | 3/2014 | Alrabady et al. |

(Continued)

FOREIGN PATENT DOCUMENTS

JP 5829839 B2 12/2015

OTHER PUBLICATIONS

Extended European Search Report dated Jan. 3, 2020 for European Patent Application No. 19188099.6.

*Primary Examiner* — Chat C Do
*Assistant Examiner* — Noor Alkhateeb
(74) *Attorney, Agent, or Firm* — Volpe Koenig

(57) ABSTRACT

Software is prevented from being distributed due to a human-caused error. A software distribution system includes a software distribution server that uses a campaign to manage an update of a function for an in-vehicle device of a vehicle and remotely distributes software based on the campaign, a terminal that executes input and output, and a software update device that is attached to the vehicle and configured to download the distributed software and install the software in the in-vehicle device. In the software distribution system, when the creation of the campaign is requested, statistical information of updated amounts of the software updated based on the most recent multiple campaigns in the target in-vehicle device for the requested campaign is compared with an updated amount of the software updated based on the requested campaign. When a predetermined requirement is satisfied, the requested campaign is not created and a predetermined alert is notified.

15 Claims, 14 Drawing Sheets

(56) References Cited

U.S. PATENT DOCUMENTS

| | | | | |
|---|---|---|---|---|
| 2016/0364232 A1* | 12/2016 | Moeller | .................. | H04L 67/34 |
| 2017/0212746 A1* | 7/2017 | Quin | ........................ | H04L 67/12 |
| 2018/0260500 A1* | 9/2018 | Hati | ........................ | G06F 30/20 |
| 2020/0034140 A1* | 1/2020 | Arai | ........................ | H04L 67/34 |
| 2020/0042703 A1* | 2/2020 | Herman Saffar | ... | G06F 11/1435 |

\* cited by examiner

| VIN | VEHICLE TYPE ID | POSITION | UPDATE DATE AND TIME |
|---|---|---|---|
| 9GJH | X-Veh | (35.57,39.71) | 2017/10/27 14:47:01 |
| 3HEW | X-Veh | (48.84,32.05) | 2017/10/26 10:33:22 |
| 7RTM | N-Bok | (37.38,-121.97) | 2017/10/21 08:56:50 |
| ⋮ | ⋮ | ⋮ | ⋮ |

| VIN | ECU-ID | SERIAL ID | SOFTWARE VERSION | UPDATE DATE AND TIME |
|---|---|---|---|---|
| 9GJH | Engine_MY15 | E17D33F | 12.1.3 | 2017/10/25 13:36:34 |
| 9GJH | Steer_16JP | B99ZM1A | 5.1.1 | 2017/10/25 13:36:34 |
| 7RTM | Engine_MY15 | Z97IA73L | 12.0.8 | 2017/10/21 08:52:14 |
| ⋮ | ⋮ | ⋮ | ⋮ | ⋮ |

| 1231 | 1232 | 1233 | 1234 | 1235 | 1236 |
|---|---|---|---|---|---|
| CAMPAIGN ID | VIN | ECU-ID | SOFTWARE ID | STATUS | UPDATE DATE AND TIME |
| T45M012 | 9GJH | Engine_MY15 | APA_ver13 | UPDATE COMPLETED | 2017/10/28 18:32:14 |
| T13M012 | 7RTM | Steer_16JP | B73H_v5 | DOWNLOAD COMPLETED | 2017/10/28 11:16:54 |
| T82M338 | 6ABC | Engine_MY14EU | CC8Y_v2 | INSTALLING | 2017/10/30 08:42:34 |
| ⋮ | ⋮ | ⋮ | ⋮ | ⋮ | ⋮ |

| 1241 | 1242 | 1243 | 1244 | 1245 | 1246 | 1247 |
|---|---|---|---|---|---|---|
| SOFTWARE ID | FILE NAME | UPDATE TYPE | PREVIOUS VERSION | SUBSEQUENT VERSION | FILE SIZE | UPDATE DATE AND TIME |
| APA_ver13 | aaa.odx | DIFFERENTIAL | 12.1.3 | 13.0.1 | 500kB | 2017/10/29 09:59:04 |
| B73H_v5 | bbb.bin | FULL | null | 5.1.2 | 100kB | 2017/10/29 19:08:22 |
| CC8Y_v2 | ccc.txt | DIFFERENTIAL | 12.0.8 | 12.1.1 | 50kB | 2017/10/31 08:52:14 |
| ⋮ | ⋮ | ⋮ | ⋮ | ⋮ | ⋮ | ⋮ |

FIG. 9

CAMPAIGN CREATION SCREEN

| CAMPAIGN ID | T45M012 |
|---|---|

| VIN | 9GJH |
|---|---|
| ECU-ID | Engine_MY15 |
| SOFTWARE ID | APA_ver13 |

| FILE NAME | aaa.odx |
|---|---|
| UPDATE TYPE | DIFFERENTIAL |
| PREVIOUS VERSION | 12.1.3 |
| SUBSEQUENT VERSION | 13.0.1 |
| FILE SIZE | 500kB |
| UPDATE DATE AND TIME | 2017/10/29 09:59:04 |

[ CREATE CAMPAIGN ]

CHANGED AMOUNT OF SOFTWARE

SECOND PREVIOUS CHANGED AMOUNT | PREVIOUS CHANGED AMOUNT | MOST RECENT CHANGED AMOUNT

UPDATE ORDER

<CAUTION> MOST RECENT CHANGED AMOUNT OF SOFTWARE IS LARGER THAN PREVIOUS CHANGED AMOUNTS. ARE YOU SURE YOU REALLY WANT TO CREATE CAMPAIGN?

[ YES ]   [ NO ]

FIG. 12

| TEST PLAN ID 1251 | TEST NUMBER 1252 | STATUS 1253 | TEST START DATE AND TIME 1254 | TEST END DATE AND TIME 1255 | TEST VEHICLE VIN 1256 | ECU-ID 1257 | SOFTWARE ID 1258 | TEST START POSITION 1259 | UPDATE DATE AND TIME 1260 |
|---|---|---|---|---|---|---|---|---|---|
| T45M012Trial | 1 | COMPLETED | 2017/10/31 10:00:00 | 2017/10/31 12:00:00 | 9GJH | Engine_MY18 | APA_ver13 | (35.57123, 39.71579) | 2017/10/27 14:47:01 |
| T45M012Trial | 2 | NOT DISTRIBUTED | 2017/10/31 10:00:00 | 2017/10/31 12:00:00 | 9GJH | Engine_MY18 | APA_ver13_2 | (35.57123, 39.71579) | 2017/10/27 14:47:12 |
| T45M012Trial | 3 | NOT DISTRIBUTED | 2017/10/31 10:00:00 | 2017/10/31 12:00:00 | 9GJH | Engine_MY18 | APA_ver13_3 | (35.57421, 39.71001) | 2017/10/28 09:44:33 |
| ... | ... | ... | ... | ... | ... | ... | ... | ... | ... |

1250

SOFTWARE DISTRIBUTION SYSTEM, SOFTWARE DISTRIBUTION SERVER, AND SOFTWARE DISTRIBUTION METHOD

BACKGROUND

The present invention relates to a software distribution system, a software distribution server, and a software distribution method and is suitable to be applied to a software distribution system, a software distribution server, and a software distribution method that enable software to be remotely updated for a device attached to a vehicle such as a car.

In recent years, with the development of driving support functions and automatic driving techniques, the sizes of software installed in in-vehicle devices (electric control unit (ECU)) have been increased. The number of cases where the ECU software needs to be updated for test version upgrades at design and development stages, the handling of a recall due to a software failure, collective version upgrades before and after mass productions, and the like is increasing. There are increasing expectations for a software distribution technique for remotely updating ECU software for cars or so-called Over-the-Air (OTA) distribution by applying a wireless remote software update technique, which has been used for traditional mobile phones and televisions, to cars in order to efficiently handle the increase in the number of cases where the software needs to be updated.

For example, Japanese Patent No. 5829839 discloses a program provision system that prevents a user from operating an in-vehicle device during an update of a program of a control device installed in a vehicle. The program provision system disclosed in Japanese Patent No. 5829839 can effectively complete the update of the program (software) by giving an instruction to update the program when the user of the vehicle is sufficiently far away from the vehicle so as not to operate the in-vehicle device during the update of the program.

SUMMARY

However, in the program provision system disclosed in Japanese Patent No. 5829839, an effect of reliably updating distributed software is obtained, but it is not possible to prevent software to be distributed from being erroneously selected due to a human-caused error.

Regarding OTA distribution for ECUs of cars, the number of types of ECUs to which software is distributed tends to increase, and file names and version names of the software to be distributed to the ECUs are similar in many cases. Thus, in the determination of software to be distributed, software may be erroneously selected due to a human-caused error. Especially, in a process of designing and developing a car, a test is repeatedly conducted using software of multiple versions. Thus, a software version may be mistakenly confirmed or mistakenly read in many cases. When inappropriate software is distributed, a valuable time period for the test may be reduced due to rework. Thus, a software distribution technique effective to handle such problems is required.

The present invention has been devised under the aforementioned circumstances. The present invention provides a software distribution system, a software distribution server, and a software distribution method that can prevent software from being erroneously distributed due to a human-caused error in an update of software for an in-vehicle device.

To solve the problems, the present invention provides the following software distribution system that controls an update of a function for an in-vehicle device of a vehicle. The software distribution system includes a software distribution server that uses a campaign to manage the update of the function and remotely distributes software based on the campaign to a target vehicle for the campaign, a terminal that receives an operation by an operator and executes input and output from and to the software distribution server, and a software update device that is attached to the vehicle and configured to download the software distributed by the software distribution server and install the downloaded software in the target in-vehicle device. The software distribution server includes a storage section that stores various types of information including the software, a campaign managing section that receives information necessary for the campaign from the terminal and creates the campaign by registering campaign information constituted by the received information in the storage section, and a software distributing section that remotely distributes the software based on the campaign to the target vehicle for the campaign in accordance with the campaign information registered in the campaign managing section. In the software distribution system, when the creation of the campaign is requested by an operation of the terminal, the campaign managing section compares statistical information of updated amounts of the software updated based on the most recent multiple campaigns in the in-vehicle device of the target vehicle for the requested campaign with an updated amount of the software updated based on the requested campaign. When a predetermined requirement is satisfied, the campaign managing section does not create the requested campaign, prepares a predetermined alert, transmits the predetermined alert to the terminal, and the terminal displays the predetermined alert on a predetermined display screen.

In addition, in order to solve the problems, the present invention provides the following software distribution server that uses a campaign to manage an update of a function for an in-vehicle device of a vehicle and remotely distributes software based on the campaign to the target vehicle for the campaign. The software distribution server includes a storage section that stores various types of information including the software, a campaign managing section that receives information necessary for the campaign from a terminal and creates the campaign by registering campaign information constituted by the received information in the storage section, and a software distributing section that remotely distributes the software based on the campaign to the target vehicle for the campaign in accordance with the campaign information registered in the campaign managing section. When the campaign managing section receives a request to create the campaign from the terminal, the campaign managing section compares statistical information of updated amounts of the software updated based on the most recent multiple campaigns in the in-vehicle device of the target vehicle for the requested campaign with an updated amount of the software updated based on the requested campaign. When a predetermined requirement is satisfied, the campaign managing section does not create the campaign, prepares a predetermined alert, and transmits the predetermined alert to the terminal.

In addition, in order to solve the problems, the present invention provides the following software distribution method to be executed by a software distribution system that controls an update of a function for an in-vehicle device of a vehicle. The software distribution system includes a software distribution server that uses a campaign to manage the update of the function and remotely distributes software based on the campaign to the target vehicle for the campaign, a terminal that receives an operation by an operator and executes input and output from and to the software distribution server, and a software update device that is attached to the vehicle and configured to download the software distributed by the software distribution server and install the downloaded software in the target in-vehicle device. The software distribution server includes a storage section that stores various types of information including the software, a campaign managing section that receives information necessary for the campaign from the terminal and creates the campaign by registering campaign information constituted by the received information in the storage section, and a software distributing section that remotely distributes the software based on the campaign to the target vehicle for the campaign in accordance with the campaign information registered in the campaign managing section. In the software distribution system having the aforementioned configuration, the software distribution method includes, when the creation of the campaign is requested by an operation of the terminal, causing the campaign managing section to compare statistical information of updated amounts of the software updated based on the most recent multiple campaigns in the in-vehicle device of the target vehicle for the requested campaign with an updated amount of the software updated based on the requested campaign; inhibiting, when a predetermined requirement is satisfied in the comparison, the campaign managing section from creating the requested campaign, and causing the campaign managing section to prepare a predetermined alert and transmit the predetermined alert to the terminal; and causing the terminal to receive the predetermined alert and display the predetermined alert received from the campaign managing section on a predetermined display screen.

According to the present invention, in a software update for an in-vehicle device, it is possible to prevent software from being erroneously distributed due to a human-caused error. Especially, the present invention provides an efficient effect in a test conducted in a development process.

BRIEF DESCRIPTION OF THE DRAWINGS

FIG. 2 is a diagram depicting a specific example of vehicle information.

FIG. 3 is a diagram depicting a specific example of vehicle configuration information.

FIG. 4 is a diagram depicting a specific example of campaign information.

FIG. 5 is a diagram depicting a specific example of update software information.

FIG. 9 is a diagram describing an example of a campaign creation screen.

FIG. 12 is a diagram depicting a specific example of test plan information.

DETAILED DESCRIPTION

Hereinafter, embodiments of the present invention are described in detail with reference to the accompanying drawings.

In the present specification, a "campaign" means a unit of information, which is used to manage update software and in which information of one or more vehicles that are distribution destinations is associated with the update software to be distributed to update the same function of one or more in-vehicle devices (ECUs) attached to the one or more vehicles.

The campaign is used for various purposes. The campaign is used for entire distribution of update software for many vehicles or is used for limited distribution of the update software for a specific vehicle (test vehicle) limited for test (inspection) use. As the entire distribution of the update software, the update software may be distributed for the purpose of improving functions of multiple vehicles in a mass production process or after the distribution of the vehicles, or for the purpose of handling a recall of multiple vehicles in a mass production process or after the distribution of the vehicles. For example, update software for solving the cause of a recall is distributed and installed in a target ECU to update a function. As the limited distribution of the update software, update software for a test may be distributed for the purpose of confirming a function of a specific vehicle (test vehicle) at a design and development stage, or for the purpose of measuring performance of the specific vehicle at the design and development stage, or the like. For example, the update software for the test is distributed to a test vehicle and installed in a target ECU so as to configure software settings for a traveling test to be conducted on a test course or the like.

In software distribution based on a campaign, the campaign is created by registering campaign information specifying update software, the update software is distributed to a target vehicle 20 based on the registered campaign information and installed in an ECU. In the creation of the campaign, an operator (engineer, administrator, or the like) needs to specify the update software, but may erroneously select inappropriate software due to a human-caused error such as misreading of version information or an erroneous operation. A software distribution system according to each of the embodiments executes an "inappropriateness probability determination process" (described later) to prevent a campaign from being created based on such selection of inappropriate software as described above.

(1) First Embodiment

(1-1) Configuration of Software Distribution System 1

Figure 1:
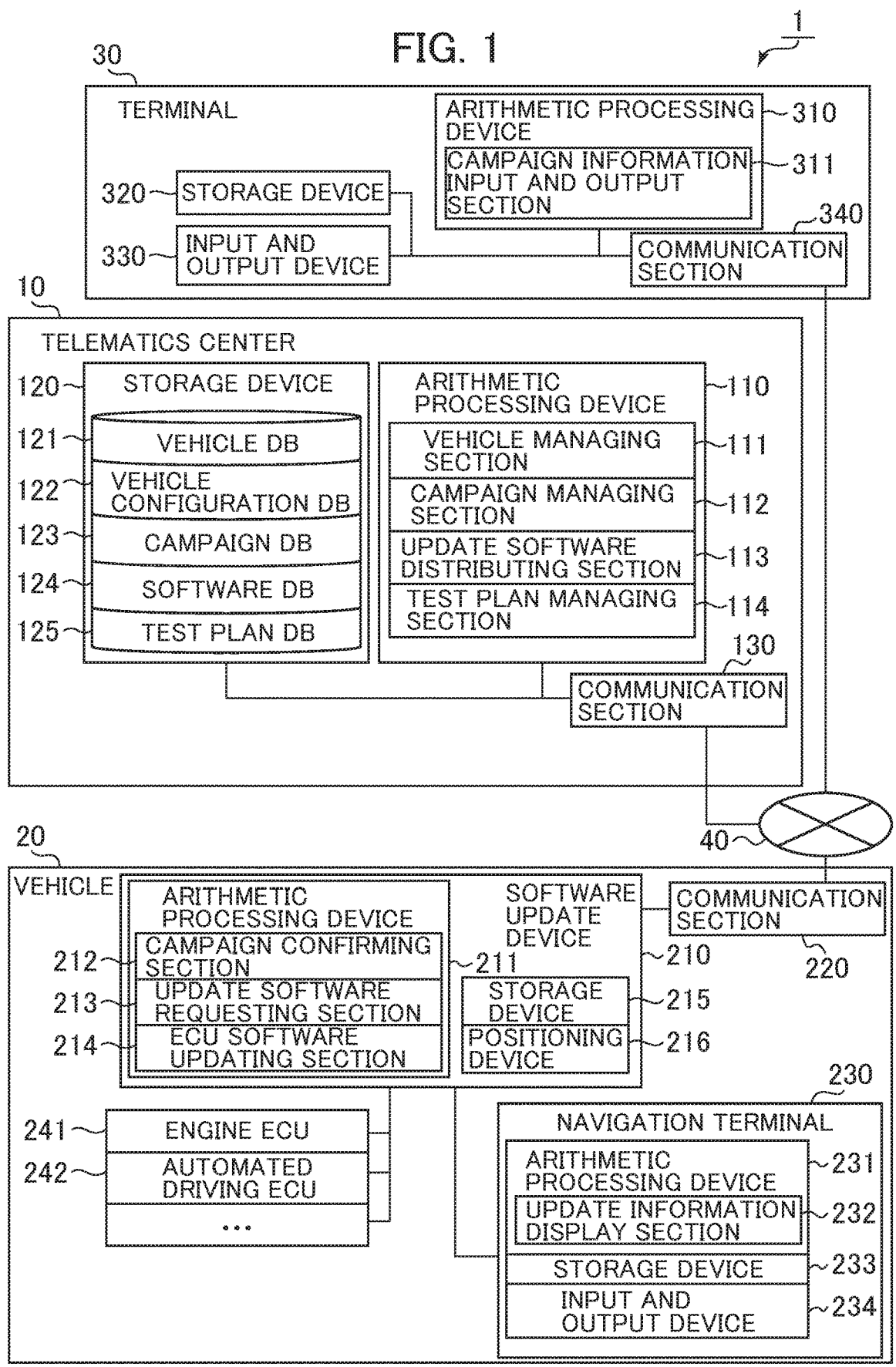
FIG. 1 is a diagram depicting an example of a configuration of a software distribution system according to a first embodiment of the present invention.

FIG. 1 is a diagram depicting an example of a configuration of a software distribution system according to a first embodiment of the present invention. The software distribution system 1 depicted in FIG. 1 is configured to distribute software to a vehicle 20 and includes a telematics center 10, the vehicle 20, and a terminal 30. The telematics center 10 is a software distribution server. The vehicle 20 has a software update device 210 and a navigation terminal 230. The terminal 30 executes input and output from and to the telematics center 10.

As depicted in FIG. 1, the telematics center 10 is connected to a network 40 via a communication section 130, the software update device 210 of the vehicle 20 is connected to the network 40 via a communication section 220 of the vehicle 20, and the terminal 30 is connected to the network 40 via a communication section 340. The telematics center 10, the vehicle 20 (or the software update device 210), and the terminal 30 are connected to and able to communicate with each other via the network 40. The network 40 may be constituted by a mobile phone network, an Internet network, a near-field communication network such as a wireless local area network (LAN), or a combination thereof, for example.

FIG. 1 depicts only the single vehicle 20, but a configuration according to the first embodiment is not limited to this. Multiple vehicles 20, each of which has a software update device 210 and a navigation terminal 230, may be connected to and able to communicate with the telematics center 10 and the terminal 30 via the network 40. In addition, the telematics center 10 and the terminal 30 may be included in the same apparatus.

(1-1-1) Telematics Center 10

The telematics center 10 is a software distribution server (for example, a cloud server) and receives an instruction to distribute software from the terminal 30 via the network 40 and distributes the software to the vehicle 20. The telematics center 10 includes an arithmetic processing device 110, a storage device 120, and the communication section 130.

The arithmetic processing device 110 is constituted by a central processing unit (CPU), a random access memory (RAM), and the like, for example. The arithmetic processing device 110 executes a predetermined program, thereby enabling functions of the telematics center 10. The arithmetic processing device 110 includes a vehicle managing section 111, a campaign managing section 112, an update software distributing section 113, and a test plan managing section 114 as functional configurations of the arithmetic processing device 110. The test plan managing section 114 is a configuration according to a second embodiment and is not necessarily required in the first embodiment.

The vehicle managing section 111 manages information stored in a vehicle DB 121 included in the storage device 120 and a vehicle configuration DB 122 included in the storage device 120 and may register, change, and delete information stored in the vehicle DB 121 and the vehicle configuration DB 122 as needed.

The campaign managing section 112 manages campaign information stored in a campaign DB 123 included in the storage device 120 and may register, change, and delete campaign information stored in the campaign DB 123 in a process executed in the software distribution system 1.

The update software distributing section 113 extracts, from a software DB 124 included in the software device 120, update software appropriate for the vehicle 20 in accordance with a request from the vehicle 20 (or an update software requesting section 213) and distributes the extracted update software to the vehicle 20 via the communication section 130 and the network 40.

The test plan managing section 114 manages test plan information stored in a test plan DB 125 included in the storage section 120 and may register, change, and delete test plan information stored in the test plan DB 125 in a process executed in the software distribution system 1. The test plan information is described in detail in the second embodiment.

The storage device 120 is constituted by a hard disk drive (HDD), a solid state drive (SSD), a flash memory, a read only memory (ROM), or the like, for example. In the storage device 120, in addition to a program to be executed by the arithmetic processing device 110, a data group necessary to execute the program, and the like are stored.

As depicted in FIG. 1, the storage device 120 includes the vehicle DB 121, the vehicle configuration DB 122, the campaign DB 123, the software DB 124, and the test plan DB 125, and the like as data groups stored in the storage device 120. The test plan DB 125 is a configuration according to the second embodiment and is not necessarily required in the first embodiment.

The vehicle DB 121 accumulates "vehicle information" constituted by information indicating a vehicle type, a usage status, a constraint upon software distribution, and the like for each of one or more vehicles 20. A specific example of the vehicle information is depicted in FIG. 2 described later.

The vehicle configuration DB 122 accumulates "vehicle configuration information" constituted by information to be used to manage types of ECUs installed in the vehicles 20 and versions of installed software, and the like. A specific example of the vehicle configuration information is depicted in FIG. 3 described later.

The campaign DB 123 accumulates "campaign information" constituted by information necessary for campaigns to be executed for the vehicles 20. The campaign information is constituted by information to be used to manage types of ECUs with software to be updated based on the campaigns, constraints upon the distribution of update software, the numbers of target vehicles for updates, and the like. A specific example of the campaign information is depicted in FIG. 4 described later.

The software DB 124 accumulates update software to be distributed to the vehicles 20 based on the campaigns and management information (update software information) of the update software. In the present specification, the "update software information" is merely referred to as "software information" in some cases.

The test plan DB 125 accumulates "test plan information" constituted by information necessary for a test plan to be conducted for a vehicle 20 (test vehicle) specific for a test.

The communication section 130 is constituted by a network card or the like that conforms to a communication standard used for the network 40 and is configured to transmit and receive data between the vehicle 20 and the terminal 30 via the network 40 based on various protocols. The network card conforms to a communication standard for wired communication via a wired LAN or the like, a communication standard for wireless communication via a wireless LAN or the like, or a communication standard for both wired and wireless communication.

(1-1-2) Vehicle 20

The vehicle 20 includes the software update device 210, the communication section 220, the navigation terminal 230, and various ECUs (including an engine ECU 241, an automated driving ECU 242, . . . ). The software update device 210, the communication section 220, the navigation terminal 230, and the ECUs of the vehicle 20 are connected to each other via an in-vehicle network such as a controller area network (CAN) or an Ethernet (registered trademark) network.

The software update device 210 includes an arithmetic processing device 211, a storage device 215, and a positioning device 216.

The arithmetic processing device 211 is constituted by a CPU, a RAM, and the like, for example. The arithmetic processing device 211 executes a predetermined program, thereby enabling functions of the software update device 210. The arithmetic processing device 211 includes a campaign confirming section 212, the update software requesting section 213, and an ECU software updating section 214 as functional configurations of the arithmetic processing device 211.

The campaign confirming section 212 makes an inquiry to the telematics center 10 with the start of an engine of the vehicle 20 as a trigger and confirms whether a campaign to update software for an ECU of the vehicle 20 exists.

When the campaign to update the software for the ECU of the vehicle 20 exists as a result of the confirmation by the campaign confirming section 212, the update software requesting section 213 requests the telematics center 10 update software based on the campaign and downloads the update software from the telematics center 10.

The ECU software updating section 214 uses the update software downloaded by the update software requesting section 213 to update the software installed in the target ECU for the update.

The storage device 215 is constituted by an HDD, an SSD, a flash memory, a ROM, or the like, for example. In the storage device 215, a program to be executed by the arithmetic processing device 211, a data group necessary to execute the program, and the like are stored.

The positioning device 216 is constituted by a global positioning system (GPS) sensor or the like, for example. The positioning device 216 acquires positional information (latitude information and longitude information) identifying a current position of the vehicle 20.

The communication section 220 is constituted by a network card or the like that conforms to the communication standard used for the network 40. The communication section 220 is configured to transmit and receive data to and from the telematics center 10 and the terminal 30 via the network 40 based on the various protocols. The network card conforms to the communication standard for wireless communication via a wireless LAN or the like, for example.

The navigation terminal 230 is constituted by a general car navigation device having a navigation function of guiding a current position of the vehicle 20 and guiding a route to a destination, during traveling of the vehicle 20, and a tablet terminal having the navigation function, or the like. The navigation terminal 230 includes an arithmetic processing device 231, a storage device 233, and an input and output device 234.

The arithmetic processing device 231 is constituted by a CPU, a RAM, and the like, for example. The arithmetic processing device 231 executes a predetermined operation program, thereby enabling the navigation function of the navigation terminal 230. The arithmetic processing device 231 includes an update information display section 232 as a functional configuration of the arithmetic processing device 231. The update information display section 232 causes the input and output device 234 to display a display screen based on the navigation function, a display screen based on information of the update software transmitted by the telematics center 10, and the like.

The storage device 233 is constituted by an HDD, an SSD, a flash memory, a ROM, or the like, for example. In the storage device 233, a program to be executed by the arithmetic processing device 231, a data group necessary to execute the program, and the like are stored.

The input and output device 234 is constituted by a touch panel, a keyboard, a mouse, or a combination thereof and functions as an input section and an output section (display section) for the navigation terminal 230 and the software update device 210.

In the vehicle 20 according to the embodiment, the software update device 210 and the navigation terminal 230 may be enabled by the same apparatus. The navigation terminal 230 may not be installed in the vehicle 20. For example, instead of the navigation terminal 230, a mobile terminal that has the same function as the navigation terminal 230 and is a smartphone, a tablet, or the like may be used. In this case, it is considered that the communication section 220 is installed near the mobile terminal, and the software update device 210 uses a connector such as on-board diagnostics (OBD) so that the software update device 210 communicates with the mobile terminal.

The engine ECU 241 manages an operation of the engine of the vehicle 20. The automated driving ECU 242 manages operational control of automated driving of the vehicle 20. As depicted in FIG. 1, the ECUs are connected to a bus CAN network, and the software update device 210 has a hub function for the bus CAN network of the ECUs.

FIG. 1 depicts the engine ECU 241 and the automated driving ECU 242 as an example of in-vehicle devices that are installed in the vehicle 20 and to which update software is distributed in the software distribution system 1. The various ECUs installed in the vehicle 20 are not limited to the aforementioned ECUs. For example, ECUs that are a suspension control ECU, an electronic mirror control ECU, and the like and have a function of supporting control and safety of the vehicle 20 may be installed in the vehicle 20. Software for operating the ECUs is installed in the ECUs. The software is stored in storage devices (not depicted) included in the ECUs and is executed by central processing units (not depicted) included in the ECUs. The software distribution server (telematics center 10) according to the embodiment distributes update software to update the software installed in the ECUs.

(1-1-3) Terminal 30

The terminal 30 is a general-purpose computer, a mobile terminal such as a tablet or a smartphone, or the like and includes an arithmetic processing device 310, a storage device 320, an input and output device 330, and the communication section 340.

The arithmetic processing device 310 is constituted by a CPU, a ROM, and the like, for example. The arithmetic processing device 310 executes a predetermined operation program, thereby enabling functions of the terminal 30. The arithmetic processing device 310 includes a campaign information input and output section 311 as a functional configuration of the arithmetic processing device 310.

The campaign information input and output section 311 transmits information corresponding to the campaign information or the like to the telematics center 10 in response to an operation of the input and output device 330 by a user. The campaign information input and output section 311 causes the input and output device 330 to display information received from the telematics center 10.

The storage device 320 is constituted by an HDD, an SSD, a flash memory, a ROM, or the like, for example. In the storage device 320, a program to be executed by the arithmetic processing device 211, a data group necessary to execute the program, and the like are stored.

The input and output device 330 is constituted by a touch panel, a keyboard, a mouse, or a combination thereof and functions as an input section and an output section (display section) for the terminal 30 and the telematics center 10.

The communication section 340 is constituted by a network card or the like that conforms to the communication standard used for the network 40. The communication section 340 is configured to transmit and receive data to and from the telematics center 10 via the network 40 based on the various protocols. The network card conforms to the communication standard for wireless communication via a wireless LAN or the like, for example.

As described above, the terminal 30 may be enabled by the same apparatus as the telematics center 10. For example, in the case where the telematics center 10 includes the functions of the terminal 30, the telematics center 10 may include an input and output device corresponding to the input and output device 330 of the terminal 30, and the arithmetic processing device 110 may include the campaign information input and output section 311.

(1-2) Structures of Various Types of Data

Structures of various types of data stored in the DBs included in the storage device 120 of the telematics center 10 depicted in FIG. 1 are described below using specific examples. Test plan information 1250 stored in the test plan DB 125, however, is described in the second embodiment. The specific examples describe data structures in table formats, but the structures of the data described in the first embodiment are not limited to this.

FIG. 2 is a diagram depicting a specific example of the vehicle information. The vehicle information is meta information of vehicle bodies of vehicles 20 and is stored in the vehicle DB 121. Vehicle information 1210 depicted in FIG. 2 is data in a table format and includes VINs 1211, vehicle type IDs 1212, positions 1213, and update dates and time 1214.

The VINs 1211 are identifiers uniquely identifying the vehicles 20 and are vehicle identification numbers. The vehicle IDs 1212 are identifiers uniquely identifying types of the vehicles 20 (target vehicles 20 indicated in records of the vehicle information 1210) identified by the VINs 1211. The positions 1213 are positional information when engines of the target vehicles 20 are turned off last. Latitudes and longitudes of the positions 1213 are indicated in this order. The update dates and time 1214 are information indicating dates and time when the records of the vehicle information 1210 are updated.

FIG. 3 is a diagram depicting a specific example of the vehicle configuration information. The vehicle configuration information is related to ECUs included in the vehicles 20 and is stored in the vehicle configuration DB 122. Vehicle configuration information 1220 depicted in FIG. 3 is data in a table format and includes VINs 1221, ECU-IDs 1222, serial IDs 1223, software versions 1224, and update dates and time 1225.

The VINs 1221 are data common to the VINs 1211 of the vehicle information 1210 and are identifiers uniquely identifying the target vehicles 20.

The ECU-IDs 1222 are identifiers uniquely identifying the types of the ECUs installed in the target vehicles 20. The serial IDs 1223 are identifiers uniquely identifying the ECUs installed in the target vehicles 20. For example, as is apparent from the comparison of first and third rows of the data depicted in FIG. 3, even when types (ECU-IDs 1222) of ECUs are the same, serial IDs 1223 of the ECUs are different from each other.

The software versions 1224 are identifiers uniquely identifying software installed in the ECUs (specific ECUs installed in the target vehicles 20) identified in records of the vehicle configuration information 1220. The update dates and time 1225 are information indicating dates and time when the records of the vehicle configuration information 1220 are updated.

FIG. 4 is a diagram depicting a specific example of the campaign information. As described above, the campaign information is constituted by information necessary for campaigns and is stored in the campaign DB 123. Campaign information 1230 depicted in FIG. 4 is data in a table format and includes campaign IDs 1231, VINs 1232, ECU-IDs 1233, software IDs 1234, statuses 1235, and update dates and time 1236.

The campaign IDs 1231 are identifiers uniquely identifying campaign information.

The VINs 1232 are data common to the VINs 1211 of the vehicle information 1210 and the VINs 1221 of the vehicle configuration information 1220 and are information identifying vehicles 20 to which software is distributed upon campaigns in records.

The ECU-IDs 1233 are data common to the ECU-IDs 1222 of the vehicle configuration information 1220 and are information indicating types (ECU-IDs) of ECUs having software to be updated based on the campaigns in the records of the campaign information 1230.

The software IDs 1234 are identifiers identifying update software to be distributed based on the campaigns indicated in the records of the campaign information 1230. The software IDs 1234 correspond to software IDs 1241 of update software information 1240 exemplified in FIG. 5.

The statuses 1235 are information indicating processing statuses (progress statuses) of the vehicles 20 identified by the VINs 1232. The update dates and time 1236 are information indicating dates and time when the records of the campaign information 1230 are updated.

For example, as indicated in a status 1235 included in a first row of the data depicted in FIG. 4, when the status 1235 indicates "update completed", the status 1235 means that update software (software ID "APA_ver13") has been completely installed in a target ECU (ECU-ID "Engine MY15") of a target vehicle 20 (VIN "9GJH"). In this case, a date and time when the "update completed" has been confirmed (or a date and time when the installation has been completed) are recorded in an update date and time 1236.

For example, as indicated in a status 1235 included in a second row of the data depicted in FIG. 4, when the status 1235 indicates "download completed", the status 1235 means that update software (software ID "B73H v5") has been completely downloaded to a target ECU (ECU ID "Steer 16JP") of a target vehicle 20 (VIN "7RTM") but is not completely installed in the target ECU (ECU ID "Steer 16JP"). In this case, a date and time when the "download completed" has been confirmed (or a date and time when the download has been completed) are recorded in an update date and time 1236.

In addition, for example, as indicated in a status 1235 included in a third row of the data depicted in FIG. 4, the status 1235 indicates "installing", the status 1235 means that update software (software ID "CC8Y_v2") has been completely downloaded to a target ECU (ECU-ID "Engine MY14EU") of a target vehicle 20 (VIN "6ABC") and is being installed. In this case, a date and time when the start of the installation has been confirmed (or a date and time when the installation has been started) are recorded in an update date and time 1236.

FIG. 5 is a diagram depicting a specific example of the update software information. The update software information (software information) is management information of update software to be distributed to vehicles 20. The update software information and the update software are stored in the software DB 124. The update software information (software information) 1240 depicted in FIG. 5 is data in a table format and includes the software IDs 1241, file names 1242, update types 1243, previous versions 1244, subsequent versions 1245, file sizes 1246, and update dates and time 1247.

The software IDs 1241 are identifiers uniquely identifying the update software and are data common to the software IDs 1234 of the campaign information 1230 exemplified in FIG. 4.

The file names 1242 are file names of the update software managed in records of the update software information 1240. The update types 1243 are update types of the update software. For example, when an update type 1243 indicates "differential", the update type 1243 means that update software indicated by the update type 1243 is a differential file from a previous version of the update software. When the update type 1243 indicates "full", the update type 1243 means that the update software is not the differential file but is a complete file (full file).

The previous versions 1244 are names of previous versions of the update software managed in the records of the update software information 1240. The subsequent versions 1245 are names of subsequent versions of the update software managed in the records of the update software information 1240. When a previous version 1244 or a subsequent version 1245 indicates "null", the previous version 1244 or the subsequent version 1245 indicates that a previous version or a subsequent version does not exist. The file sizes 1246 are file sizes of the update software managed in the records. For example, in FIG. 5, the file sizes are described in units of kilobytes. The update dates and time 1247 are information indicating dates and time when the records of the update software information 1240 are updated.

The structures of the data stored in the DBs included in the storage device 120 of the telematics center 10 depicted in FIG. 1 are described above using the specific examples. The specific examples are used in the following description in some cases.

(1-3) Processes Related to Campaigns

Next, processes related to the creation and execution of campaigns by the software distribution system 1 according to the first embodiment are described.

(1-3-1) Registration of Update Software

Figure 6:
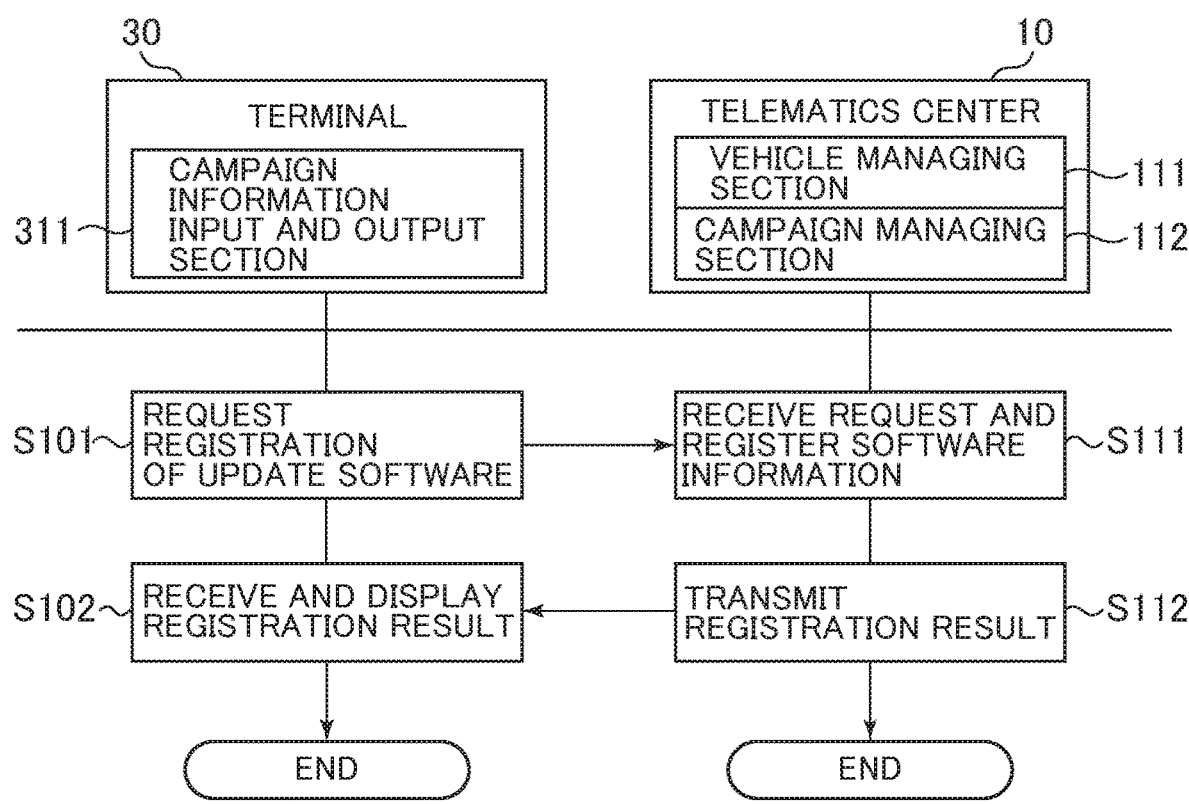
FIG. 6 is a sequence diagram depicting an example of a procedure for a process of registering update software.

FIG. 6 is a sequence diagram depicting an example of a procedure for a process of registering update software. A process depicted in FIG. 6 is executed to register (or accumulate) update software to be distributed based on campaigns in the software DB 124.

First, an engineer, an administrator, or the like operates the input and output device 330 of the terminal 30 and performs an operation of requesting the registration of update software. In this case, the update software to be registered and management information (corresponding to the software information 1240) on the update software are entered. The entered information may be stored in the storage device 320, for example.

Then, in step S101, the campaign information input and output section 311 of the terminal 30 requests the telematics center 10 to register the update software specified by the aforementioned operation. In this case, the update software and the management information are also transmitted from the terminal 30 to the telematics center 10.

The telematics center 10 receives the request provided in step S101, and the campaign managing section 112 (or the vehicle managing section 111) causes the received management information to be stored as software information 1240 of the update software in the software ID 124 (in step S111). In this case, the received update software is also stored in the software DB 124. In step S111, when the campaign managing section 112 determines that the registration of the update software is not accepted for a certain reason, the update software and the software information are not registered, and information indicating that the update software and the software information are not registered is treated as a result of registration. In step S112, the campaign managing section 112 (or the vehicle managing section 111) transmits the result of registering the update software information 1240 in step S111 to the terminal 30.

When the terminal 30 receives the registration result transmitted in step S112, the campaign information input and output section 311 of the terminal 30 causes the input and output device 330 to display the registration result (in step S102). Thus, the engineer, the administrator, or the like can confirm the result of registering the update software.

(1-3-2) Creation of Campaign

Figure 7:
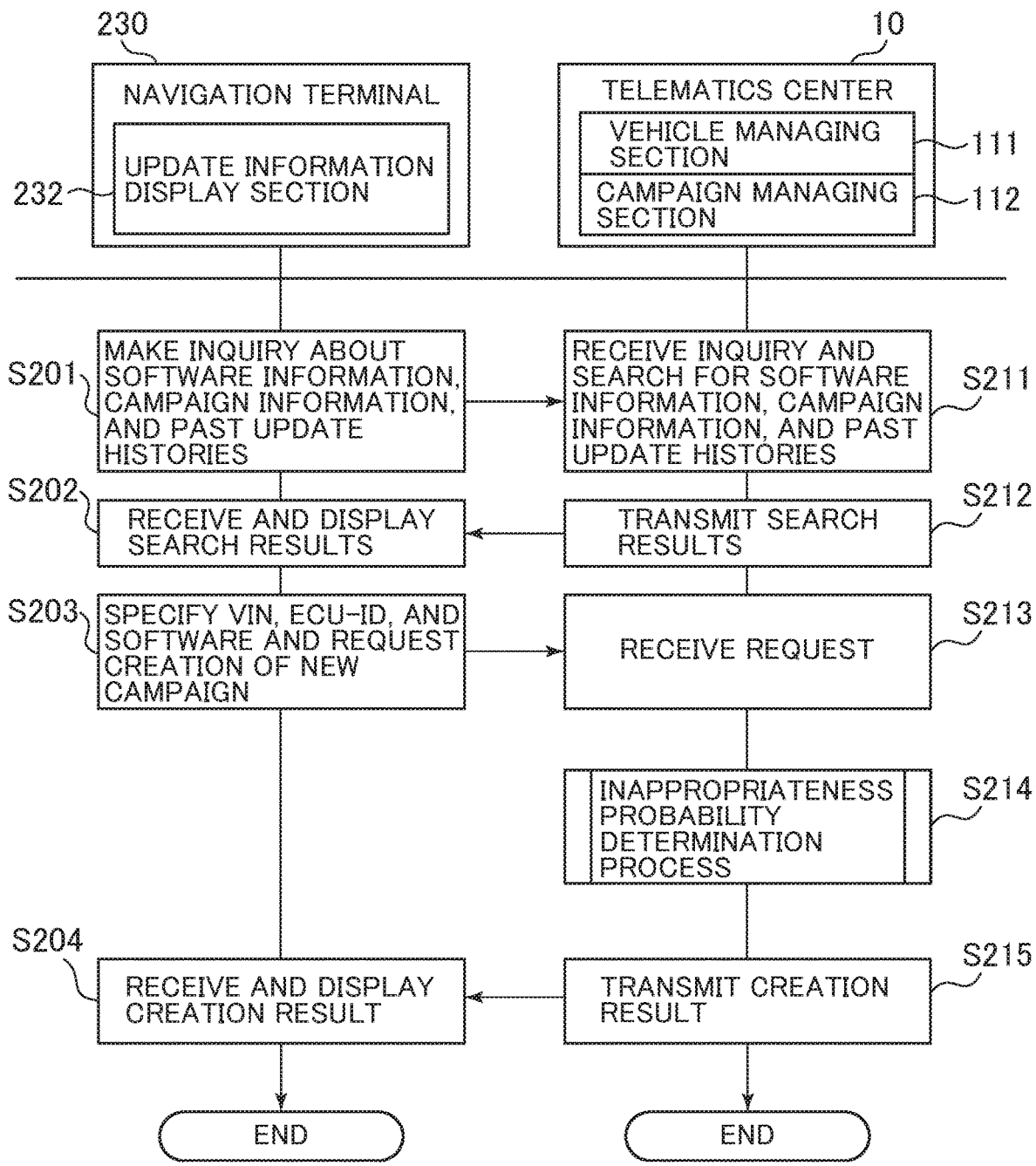
FIG. 7 is a sequence diagram depicting an example of a procedure for a process of creating a campaign.

FIG. 7 is a sequence diagram depicting an example of a procedure for a process of creating a campaign. A process depicted in FIG. 7 is executed to create a new campaign by registering campaign information.

In the example depicted in FIG. 7, a terminal that requests the creation of a campaign is the navigation terminal 230 of the vehicle 20. However, in the software distribution system 1 according to the embodiment, the terminal 30 may request the creation of the campaign. In this case, instead of the update information display section 232 depicted in FIG. 7, the campaign information input and output section 311 of the terminal 30 may execute the same process as that to be executed by the update information display section 232. As a concretely assumed case or as a specific example of a case in which the vehicle 20 requests the creation of a campaign, the engineer or the like directly creates the campaign for a specific vehicle 20 (test vehicle) in a test site in a test at a design and development stage. In addition, as a specific example of a case in which the terminal 30 requests the creation of a campaign, a campaign for entire distribution of an update program to many vehicles 20 is created.

In FIG. 7, in step S201, the update information display section 232 makes an inquiry to the telematics center 10 about the software information 1240, the campaign information 1230, and past update histories (software update histories, histories of distribution based on campaigns, and the like) in response to an operation of the input and output device 234 of the navigation terminal 230 by the engineer or the like.

The telematics center 10 receives the inquiry made in step S201, and the vehicle managing section 111 and the campaign managing section 112 search for and extract information based on the inquiry (in step S211). For example, the vehicle managing section 111 searches for and extracts information on the vehicle 20 that has made the inquiry, and the campaign managing section 112 searches for and extracts the software information 1240, the campaign information 1230, and the like from the software DB 124 and the campaign DB 123. Then, in step S212, the vehicle managing section 111 and the campaign managing section 112 transmit the search results extracted in step S211 to the navigation terminal 230.

When the navigation terminal 230 receives the search results transmitted in step S212, the update information display section 232 causes the input and output device 234 to display the search results (in step S202). Past campaign histories and the like can be recognized by confirming the displayed search results.

Next, the engineer or the like enters (specifies) predetermined information necessary to create the new campaign on a predetermined screen (campaign creation screen) displayed on the update information display section 232. A specific example of the campaign creation screen is depicted in FIG. 9. The campaign creation screen may be a screen displayed on the update information display section 232 in step S202. After the update information display section 232 receives the aforementioned entry operation, the update information display section 232 requests the telematics center 10 to create the new campaign (in step S203).

When the telematics center 10 receives the request, provided in step S203, to create the new campaign (in step S213), the campaign managing section 112 executes the "inappropriateness probability determination process" of determining whether there is a probability that inappropriate update software, which is different from update software to be distributed based on the new campaign, has been selected (in step S214).

Details of the inappropriateness probability determination process are described with reference to FIG. 8. In the inappropriateness probability determination process, when the campaign managing section 112 determines that there is a probability that inappropriate software has been selected, the campaign managing section 112 does not create the new campaign and prepares an alert message. On the other hand, when the campaign managing section 112 determines that there is no probability that inappropriate software has been selected, the campaign managing section 112 creates the new campaign (by creating and registering campaign information 1230). In step S215, the campaign managing section 112 transmits a result of creating the new campaign based on the determination result of the inappropriateness probability determination process of step S214 to the navigation terminal 230 (in step S215).

When the navigation terminal 230 receives the creation result transmitted in step S215, the update information display section 232 causes the input and output device 234 to display the creation result (on the campaign creation screen) (in step S204). Specifically, when the campaign managing section 112 determines that there is a probability that inappropriate software has been selected in the inappropriateness probability determination process (in a route including step S227), the alert message indicating that there is a probability that inappropriate software has been selected is displayed and whether the new campaign is to be created is reconfirmed. On the other hand, when the campaign managing section 112 determines that there is no probability that inappropriate software has been selected (in a route including step S228), information indicating that the creation of the new campaign requested in step S203 has been completed is displayed. After the creation of the new campaign is completed, the telematics center 10 completes preparation for the distribution of the update software based on the campaign.

Figure 8:
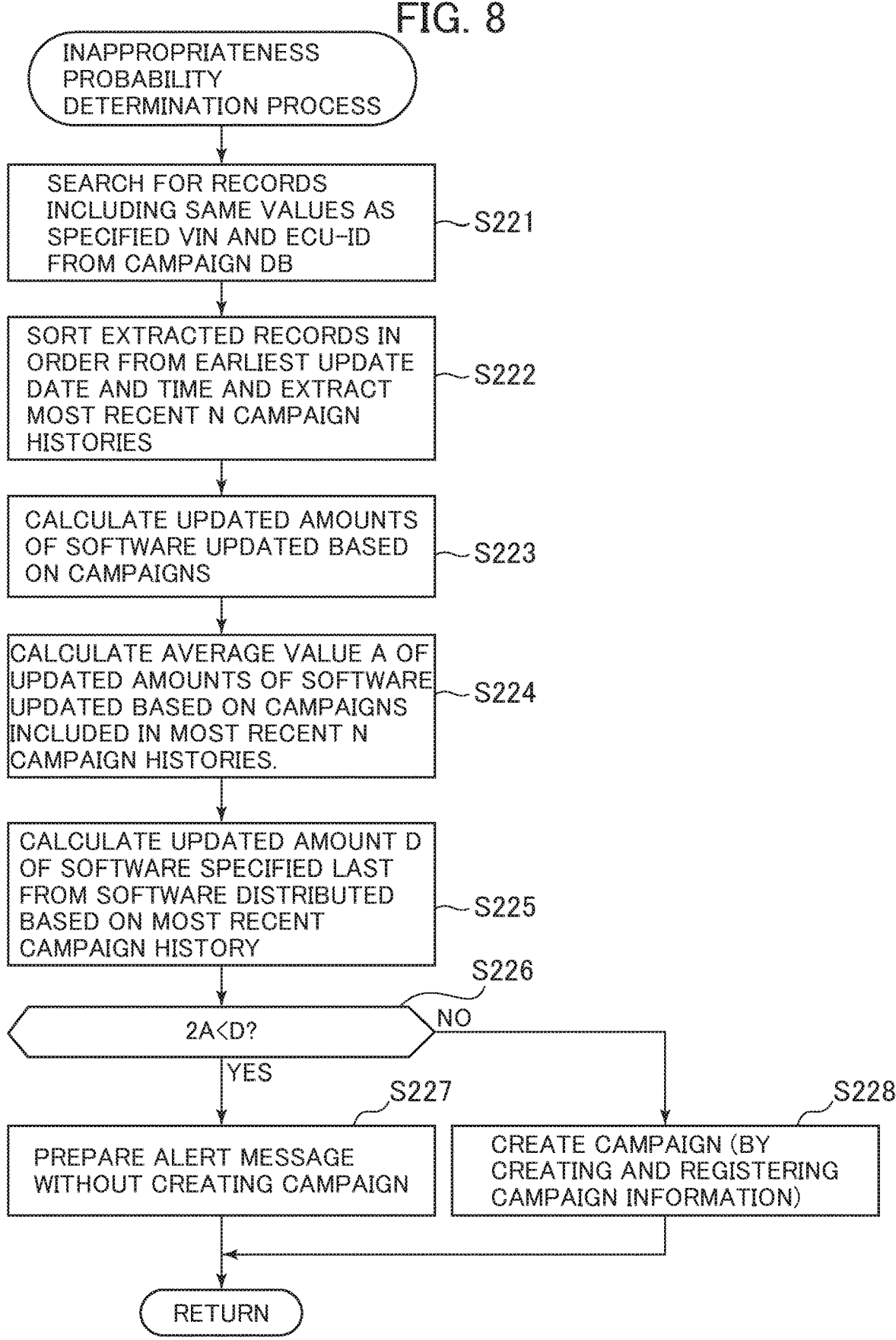
FIG. 8 is a flowchart of an example of a procedure for an inappropriateness probability determination process.

FIG. 8 is a flowchart of an example of a procedure for the inappropriateness probability determination process. As described with reference to step S214 of FIG. 7, the inappropriateness probability determination process is executed by the campaign managing section 112.

In FIG. 8, first, the campaign managing section 112 searches for, from the campaign information 1230 accumulated in the campaign DB 123, records including the same values as a VIN and an ECU-ID that are specified in the creation request (provided in step S203 of FIG. 7) from the update information display section 232, and extracts the records (in step S221). Specifically, the records extracted in step S221 are past campaign information 1230 of campaigns executed for a vehicle's ECU to which the update software is to be distributed based on the new campaign.

Next, the campaign managing section 112 sorts the records extracted in step S221 in order from the earliest update date and time and extracts campaign histories of the most recent N (N is an arbitrary integer of 2 or more) records (in step S222).

Then, the campaign managing section 112 calculates updated amounts of the software updated based on campaigns included in the campaign histories extracted in step S222 (in step S223). Specifically, the campaign managing section 112 extracts software information 1240 associated with software IDs 1234 of the campaign information 1230 from the software DB 124 and calculates the updated amounts of the software by referencing file sizes 1246 (differential sizes) of the extracted software information 1240. Then, the campaign managing section 112 calculates an average value A of the updated amounts, calculated in step S223, of the software updated based on the campaigns included in the campaign histories of the most recent N records (in step S224).

Then, the campaign managing section 112 calculates an updated amount D of the software when software distributed based on the last campaign (or the most recent campaign history) is updated to the update software to be distributed based on the new campaign specified last (in step S225).

Then, the campaign managing section 112 uses the average value A calculated in step S224 and the updated amount D calculated in step S225 to determine whether a relationship of "2A<D" is established (in step S226). When "2A<D" (YES in step S226), the process proceeds to step S227. When "2A D" (NO in step S226), the process proceeds to step S228. A requirement for determining whether "2A<D" in step S226 is an example of an index for determining whether an updated amount of software specified in a new campaign to be created is significantly different (or deviates) from an average updated amount of previous software (updated based on the most recent N campaigns). Another index based on this intent may be used.

In step S227, since the updated amount of the software specified in the new campaign is significantly different from the updated amount of the previous software, the campaign managing section 112 determines that there is a probability that inappropriate software has been selected. Thus, the campaign managing section 112 does not create campaign information 1230 on the requested new campaign and prepares the predetermined alert message indicating that there is a probability that inappropriate software has been selected.

On the other hand, in step S228, since the updated amount of the software specified in the campaign to be created is not significantly different from the updated amount of the previous software, the campaign managing section 112 determines that there is no probability that inappropriate software has been selected. Then, the campaign managing section 112 creates the campaign information 1230 on the requested new campaign and registers the created campaign information 1230 in the campaign DB 123.

After the process of step S227 or the process of step S228, the inappropriateness probability determination process is terminated. After that, the processes of step S215 and later of FIG. 7 are executed as described above.

In the inappropriate probability determination process depicted in FIG. 8, the sizes of update files of the software are used in the calculation of the updated amount of the software. This process is an example. Information other than the file sizes may be used to calculate the updated amount of the software. Examples of a method of calculating the updated amount of the software using the information other than the file sizes are a method of calculating the updated amount of the software based on a difference between the numbers of rows of source codes of the update files, a method of calculating the updated amount of the software based on the amount of differential bits in the case where the update files are in a binary format (or the update files are treated as binary files), and a method of calculating the updated amount of the software based on the numbers of ROM blocks to be updated when the update files are written to an ECU. Alternatively, the updated amount of the software may be calculated based on a combination of the aforementioned multiple information items.

In any of the aforementioned cases, in the inappropriateness probability determination process according to the first embodiment, statistical information of updated amounts of software updated a number N of times in the past is compared with an updated amount of the software updated last, and when the predetermined requirement is satisfied, the campaign managing section 112 determines that there is a probability that inappropriate software has been selected due to an erroneous operation or the like. In this case, the registration (or the creation of a campaign) of the software updated last is suspended or rejected and the alert message is prepared. In addition, the "predetermined requirement" that is used for the aforementioned determination is not limited to the specific requirement or the like as far as the "predetermined requirement" is a requirement or threshold that enables the determination of whether an updated amount of software updated a number N of times in the past is significantly different from an updated amount of the software updated last.

FIG. 9 is a diagram describing an example of the campaign creation screen. As depicted in FIG. 9, a campaign creation screen 1000 is displayed by the input and output device 234.

On the campaign creation screen 1000 exemplified in FIG. 9, detailed information of a new campaign (with a campaign ID "T45M012") is visualized in a tree format. The campaign ID, an ECU-ID, and a software ID that are displayed on a display region 1001 correspond to configuration information of the campaign information 1230. In addition, information displayed under a "file name" on the display region 1001 corresponds to configuration information included in the software information 1240 and associated with the aforementioned software ID (software ID "APA_ver13").

On the campaign creation screen 1000, a button 1002 that is selectable by an operator (engineer, administrator, or the like) is displayed under the display region 1001. As is apparent from the button 1002 on which "Create Campaign" is displayed, the button 1002 is selected when the creation of the campaign identified from the information displayed on the display region 1001 is requested.

When information necessary for the new campaign (current campaign) is entered in the display region 1001 and the creation of the campaign is requested by selecting the button 1002 on the campaign creation screen 1000, the inappropriateness probability determination process (of step S214 depicted in FIG. 7) is executed and results of the creation are displayed on a lower display region 1003 included in the campaign creation screen 1000.

In the display region 1003, results of comparing an updated amount of the software specified in the new campaign (current campaign) requested to be created with updated amounts of the software updated based on past campaigns are visually displayed. FIG. 9 depicts an image of the changed amounts (updated amounts) of the software based on the past campaigns and the changed amount of the software specified in the current or new campaign, as a display example in which it is determined that there is a probability that inappropriate software has been selected in the inappropriateness probability determination process.

As described using the route in which the answer to step S226 depicted in FIG. 8 is NO and step S227 is executed, when the campaign managing section 112 determines that the updated amount (indicated by "most recent changed amount" in FIG. 9) of the software specified in the current campaign is significantly different from the updated amounts (indicated by "previous changed amount", "second previous changed amount", and the like in FIG. 9) of the prior software, the predetermined alert message indicating that there is a probability that inappropriate software has been selected is displayed on the display region 1003. FIG. 9 depicts a specific example in which an alert message indicating that "<Caution> The most recent changed amount of the software is larger than previous changed amounts. Are you sure you really want to create the campaign?" is displayed.

In addition, on the campaign creation screen 1000, buttons 1004 and 1005 that are selectable by the operator (engineer, administrator, or the like) are arranged under the display region 1003. When the alert message is displayed on the display region 1003, any of the buttons 1004 and 1005 is operated by the operator to determine a response to the displayed alert.

Specifically, when the operator determines that inappropriate software has not been selected (or the specified update software is to be distributed based on the campaign) for the alert message displayed on the display region 1003 and indicating that there is a probability that inappropriate software has been selected, the operator selects the button 1004 on which "Yes" is displayed, and finally determines that the campaign is to be created based on currently input details. A process to be executed in this case is not depicted in FIG. 7. However, for example, the update information display section 232 instructs the telematics center 10 to create the campaign again, and the campaign managing section 112 of the telematics center 10 creates campaign information 1230 of the concerned campaign and causes the created campaign information 1230 to be stored in the campaign DB 123. Even in the case where intended update software is specified, when an updated amount of the software significantly deviates from a past history, the alert message is displayed to prompt the operator to select the button 1004 so as to enable the operator to reconfirm that inappropriate software has not been selected.

When the operator determines that inappropriate software has been selected (or the inappropriate software is not the update software to be distributed based on the campaign) for the alert message displayed on the display region 1003 and indicating that there is a probability that inappropriate software has been selected, the operator may select the button 1005 on which "No" is displayed, and finally determines that the campaign is not to be created based on current input details. A process to be executed in this case is not depicted in FIG. 7. However, for example, when the operator enters information of the appropriate update software in the display region 1001 again and selects the button 1002, the update information display section 232 requests the telematics center 10 to create a modified new campaign (or the process may return to step S203 depicted in FIG. 7 in this case).

As described with reference to FIGS. 7 to 9, in the software distribution system 1 according to the first embodiment, only when the campaign managing section 112 determines that there is no probability that inappropriate update software has been selected, the campaign managing section 112 creates and registers campaign information 1230 and creates a campaign based on the campaign information 1230. On the other hand, when the campaign managing section 112 determines that there is a probability that inappropriate update software has been selected, the alert message is displayed (in the display region 1003) on the campaign creation screen 1000 to prompt the operator to confirm and examine whether specified software is appropriate. By executing this, it is possible to prevent update software inappropriate for a campaign from being distributed due to a human-caused selection error.

(1-3-3) Distribution of Update Software

Figure 10:
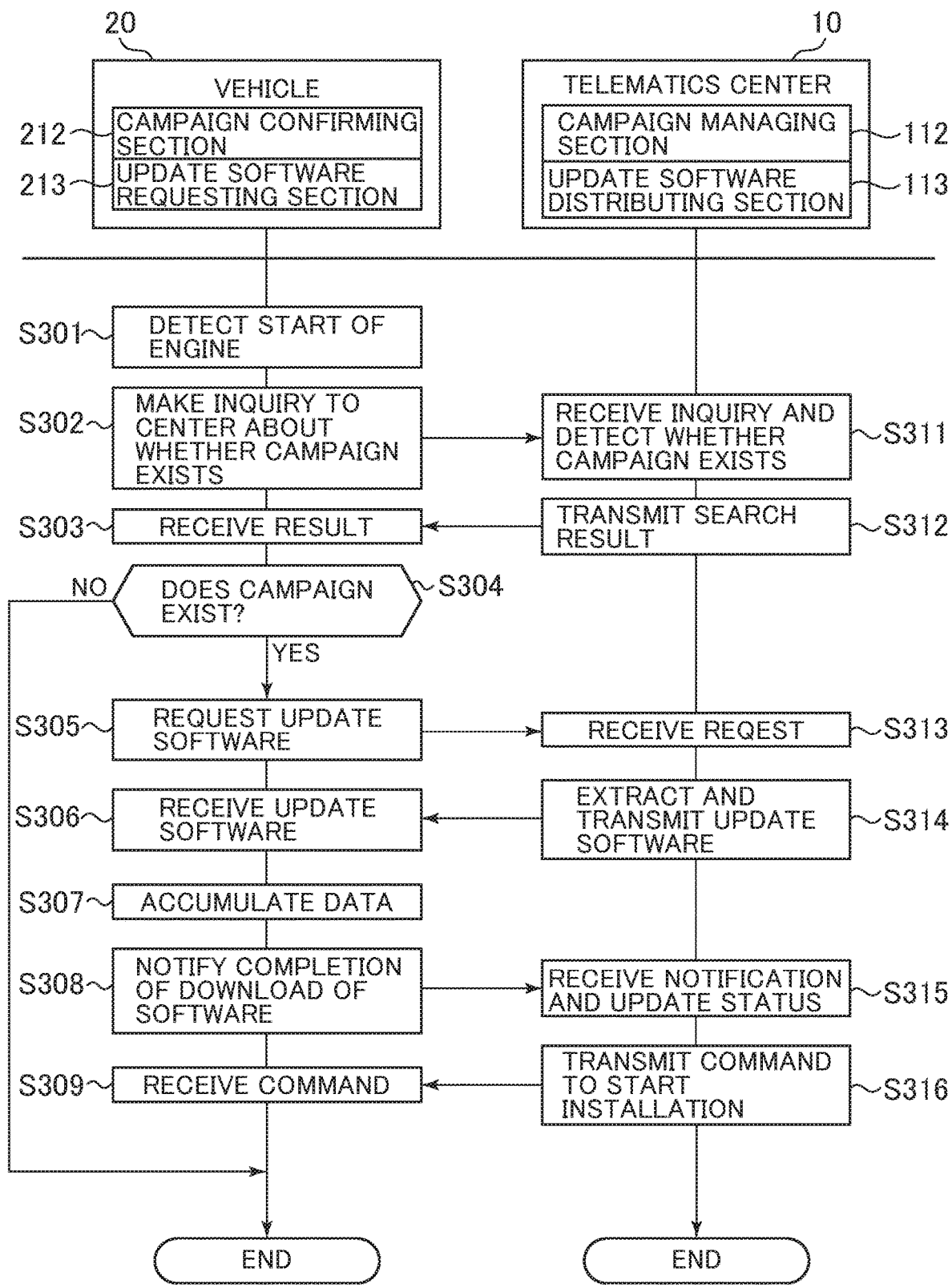
FIG. 10 is a first sequence diagram depicting an example of a procedure for a process of distributing update software based on a campaign.
Figure 11:
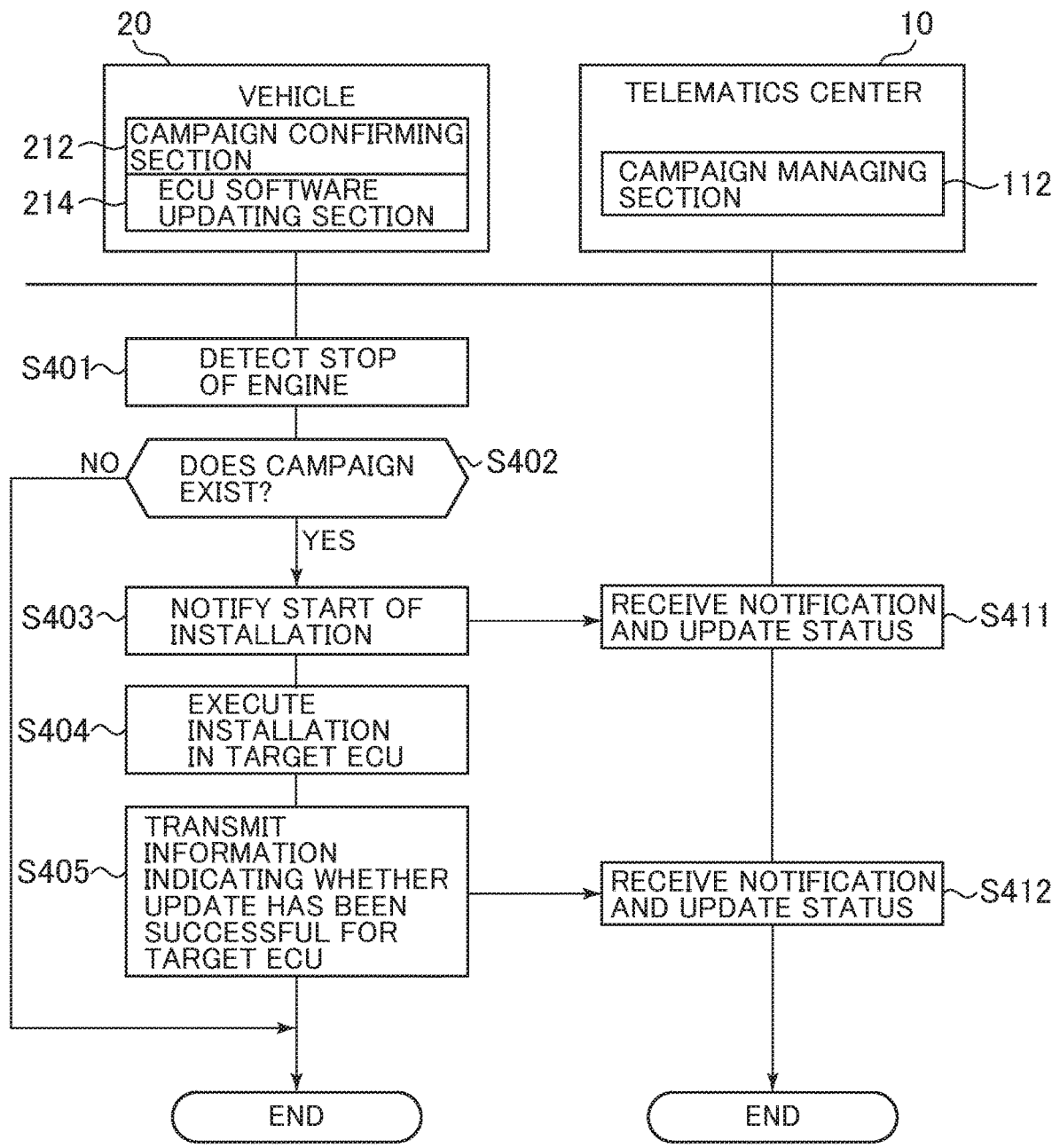
FIG. 11 is a second sequence diagram depicting the example of the procedure for the process of distributing the update software based on the campaign.

FIGS. 10 and 11 are first and second sequence diagrams depicting an example of a procedure for a process of distributing update software based on a campaign. FIG. 10 depicts a process of downloading the update software by the vehicle 20 from the telematics center 10. FIG. 11 depicts a process of installing the update software by the vehicle 20 in a target ECU after the download depicted in FIG. 10 and notifying a result of the installation to the telematics center 10.

First, the process of downloading the update software based on the created campaign is described with reference to FIG. 10. The process depicted in FIG. 10 is executed by the campaign confirming section 212 and update software requesting section 213 of the software update device 210 installed in the vehicle 20 and the campaign managing section 112 and update software distributing section 113 of the arithmetic processing device 110 installed in the telematics center 10.

In FIG. 10, first, the campaign confirming section 212 of the vehicle 20 uses information obtained from the engine ECU 214 of the vehicle 20 to detect the start (ON state) of the engine of the vehicle 20 (in step S301). When the start of the engine is detected in step S301, the campaign confirming section 212 makes an inquiry to the telematics center 10 about whether a campaign for a VIN (VIN 1211 of vehicle information 1210) of the vehicle 20 exists. (in step S302).

The telematics center 10 receives the inquiry made in step S302, and the campaign managing section 112 searches for campaign information 1230 stored in the campaign DB 123, confirms whether a record in which a VIN 1232 matches the VIN of the source vehicle 20 exists, thereby detecting whether the campaign exists (in step S311). Then, the campaign managing section 112 transmits a result (search result) of the confirmation executed in step S311 to the vehicle 20 (in step S312). Specifically, when the record in which the VIN 1232 matches the VIN of the source vehicle 20 exists in step S311, the campaign managing section 112 transmits, as the search result, campaign information 1230 included in the record. When the record in which the VIN 1232 matches the VIN of the source vehicle 20 does not exist in step S311, the campaign managing section 112 transmits the search result indicating that the campaign does not exist.

The vehicle 20 receives the search result from the telematics center 10 (in step S303), and the campaign confirming section 212 confirms whether the campaign exists based on the search result (in step S304). For example, the campaign confirming section 212 confirms whether campaign information 1230 is included in the search result. When the campaign information 1230 is not included in the search result, the campaign confirming section 212 determines that the campaign does not exist (NO in step S304). In this case, update software to be downloaded also does not exist, and the process is terminated. On the other hand, when the campaign information 1230 is included in the search result, the campaign confirming section 212 determines that the campaign exists (YES in step S304), and the update software requesting section 213 requests the telematics center 10 to provide update software identified from a software ID 1234 included in the campaign information 1230 (in step S305). The campaign found from the search result is hereinafter referred to as "execution campaign".

When the telematics center 10 receives the request provided in step S305 (in step S313), the update software distributing section 113 extracts the requested update software (or update software based on the execution campaign) from the software DB 124 based on the specified software ID 1234 and transmits the extracted update software to the vehicle 20 (in step S314).

The update software transmitted in step S314 is received by the vehicle 20 and starts to be downloaded (in step S306), and data of the downloaded update software is accumulated in the storage device 215 (in step S307). When the download of the update software is completed, the campaign confirming section 212 notifies the completion of the download to the telematics center 10 (in step S308).

When the telematics center 10 receives (accepts) the notification of the completion of the download of step S308, the campaign managing section 112 updates a status 1235 of the campaign information 1230 of the execution campaign to "download completed" and rewrites the updated status 1235 to the campaign DB 123 (in step S315). After that, the campaign managing section 112 transmits, to the vehicle 20, a command to start the installation of the update software transmitted in step S314 (in step S316).

Then, when the vehicle 20 receives (accepts) the command, transmitted in step S316, to start the installation (in step S309), the campaign confirming section 212 of the vehicle 20 transitions to a standby state to wait for the start of the installation of the update software until the engine is stopped (OFF state). The campaign confirming section 212 can use information obtained from the engine ECU 241 to detect the stop of the engine. A process to be executed after the stop of the engine is depicted in FIG. 11.

Next, the process of installing the update software based on the campaign is described with reference to FIG. 11. The process depicted in FIG. 11 is executed by the campaign managing section 212 and ECU software updating section 214 of the software update device 210 installed in the vehicle 20 and the campaign managing section 112 of the arithmetic processing device 110 installed in the telematics center 10.

In FIG. 11, first, the campaign confirming section 212 of the vehicle 20 uses the information obtained from the engine ECU 241 to detect the stop of the engine (OFF state) (in step S401). Upon detecting the stop of the engine in step S401, the campaign confirming section 212 confirms whether a campaign (execution campaign) that is being executed exists (in step S402). For example, although the campaign confirming section 212 receives the command to start the installation (in step S309 depicted in FIG. 10), the campaign confirming section 212 confirms whether update software that has yet to be completely installed exists.

When the campaign confirming section 212 confirms that the execution campaign does not exist (NO in step S402), update software to be installed does not exist and the process is terminated. On the other hand, when the campaign confirming section 212 confirms that the execution campaign exists (YES in step S402), the campaign confirming section 212 notifies the telematics center 10 of the start of the installation of the update software (downloaded in the process depicted in FIG. 10) based on the execution campaign in the target ECU (in step S403). The target ECU in which the update software is to be installed can be identified from an ECU-ID 1233 of the campaign information 1230 of the execution campaign.

The telematics center 10 receives the installation start notification provided in step S403, the campaign managing section 112 updates the status 1235 of the campaign information 1230 of the execution campaign to "installing" and rewrites the updated status 1235 to the campaign DB 123 (in step S411).

In addition, the ECU software updating section 214 of the vehicle 20 that has transmitted the installation start notification executes the installation of the software in the target ECU and rewrites the storage device of the ECU (in step S404). After that, the ECU software updating section 214 receives the result (information indicating whether the update has been successful) of the installation from the target ECU and notifies the telematics center 10 of the information indicating whether the update has been successful (in step S405).

When the telematics center 10 receives the notification provided in step S405, the campaign managing section 112 updates the status 1235 of the campaign information 1230 of the execution campaign to "update completed" and rewrites the updated status 1235 to the campaign DB 123 (in step S412).

As described above, in the software distribution system according to the first embodiment, the distribution (download and installation) of update software based on a campaign is completed by normally advancing the processes depicted in FIGS. 10 and 11, whereby the campaign is completely executed.

(2) Second Embodiment

As described above, one of purposes of using a campaign is limited distribution of update software for a test vehicle in tests. A test at a trial phase of a design and development stage is among the tests and is not completed by updating software once in many cases. A series of tests are conducted at the trial phase while the software is updated multiple times in many cases. For example, a test vehicle travels on a test course in a test, while software of different versions is sequentially updated for the same ECU of the test vehicle. Then, a change in traveling performance of the vehicle is checked.

When the series of tests are treated as a single test plan, the distribution of update software of different types is executed multiple times. Thus, multiple campaigns need to be created and sequentially executed based on the progress of the test plan. In addition, since the order (consecutive test numbers) in which the tests are conducted and start positions in the tests are defined in some cases, information to be used to manage the test plan needs to include more detailed information than the campaign information described in the first embodiment.

Under the aforementioned circumstances, in the second embodiment, it is possible to prevent inappropriate update software from being registered due to an operational error for campaigns, like the first embodiment, and to manage the test plan using test plan information derived from the campaign information.

The second embodiment is described using the software distribution system 1 exemplified in FIG. 1, like the first embodiment. Unless otherwise specified, configurations of information stored in the DBs and processes of campaigns in the second embodiment are common to those described in the first embodiment. A description of portions common to the first embodiment is omitted in some cases.

(2-1) Configuration of Test Plan Information

FIG. 12 is a diagram depicting a specific example of the test plan information. The test plan information is constituted by detailed information specific to the test plan at the design and development stage or the like and is stored in the test plan DB 125. The test plan information can be treated as information derived from the campaign information but includes more detailed items than the campaign information 1230 exemplified in FIG. 4 in the first embodiment.

Test plan information 1250 exemplified in FIG. 12 is data in a table format and includes a test plan ID 1251, consecutive test numbers 1252, statuses 1253, test start dates and time 1254, test end dates and time 1255, a test vehicle VIN 1256, an ECU-ID 1257, software IDs 1258, test start positions 1259, and update dates and time 1260.

The test plan ID 1251 is an identifier uniquely identifying a test plan and is derived from a campaign ID. In this example, a character string "Trial" is included in the test plan ID 1251 to distinguish the test plan ID 1251 from the campaign ID 1231 of the campaign information 1230. For example, in a first row of the data depicted in FIG. 12, "T45M012Trial" is described as the test plan ID 1251, and the test plan ID 1251 means the ID of the test plan corresponding to the campaign (refer to the first row of the data depicted in FIG. 4) identified by the campaign ID "T45M012".

The consecutive test numbers 1252 are information indicating the order in which individual tests included in the test plan (with the same test plan ID) are conducted.

The statuses 1253 are information indicating process statuses (progress statuses) of the tests indicated in records of the test plan information 1250. Each of the statuses 1253 indicates "completed" or "not distributed".

The test start dates and time 1254 are information indicating dates and time when the tests indicated in the records of the test plan information 1250 are started. The test end dates and time 1255 are information indicating dates and time when the tests indicated in the records of the test plan information 1250 are ended. Planned information may be described in the test start dates and time 1254 and the test end dates and time 1255. Alternatively, the planned information may be described in the test start dates and time 1254 and the test end dates and time 1255 before the tests, and dates and time when the tests are actually conducted may be described in the test start dates and time 1254 and the test end dates and time 1255 when the tests are actually conducted.

The test vehicle VIN 1256 is information identifying the vehicle 20 to which update software is distributed in the tests indicated in the records and is data common to the VIN included in the various types of information described above. In this example, for the sake of simplicity, the single test vehicle (with the test vehicle VIN "9GJH") is used. VINs of multiple test vehicles may be described.

The ECU-ID 1257 is information identifying the type of an ECU in which software is to be updated in the tests indicated in the records and is data common to the ECU-ID included in the various types of information described above.

The software IDs 1258 are information identifying the update software to be distributed in the tests indicated in the records and is data common to the software IDs 1241 of the software information 1240 depicted in FIG. 5. Identifiers identifying the update software in units of versions are described in the software IDs 1258.

The test start positions 1259 are information indicating positions of the target vehicle at the start of the tests indicated in the records. For example, coordinates of a pit of the test course and the like are described in the test start positions 1259. The test start positions 1259 also indicate positions at which the installation of the update software to be distributed in the tests is permitted.

The update dates and time 1260 are information indicating dates and time when the records of the test plan information 1250 are updated (last).

(2-2) Process of Test Plan

Next, a process related to the creation and execution of the test plan in the software distribution system 1 according to the second embodiment is described.

The update software to be distributed in the test plan is registered in the software DB 124 by executing the process, described with reference to FIG. 6 in the first embodiment, of registering the update software. Specifically, the test plan managing section 114 executes the process that is depicted in FIG. 6 and executed by the campaign managing section 112.

(2-2-1) Creation of Test Plan

Figure 13:
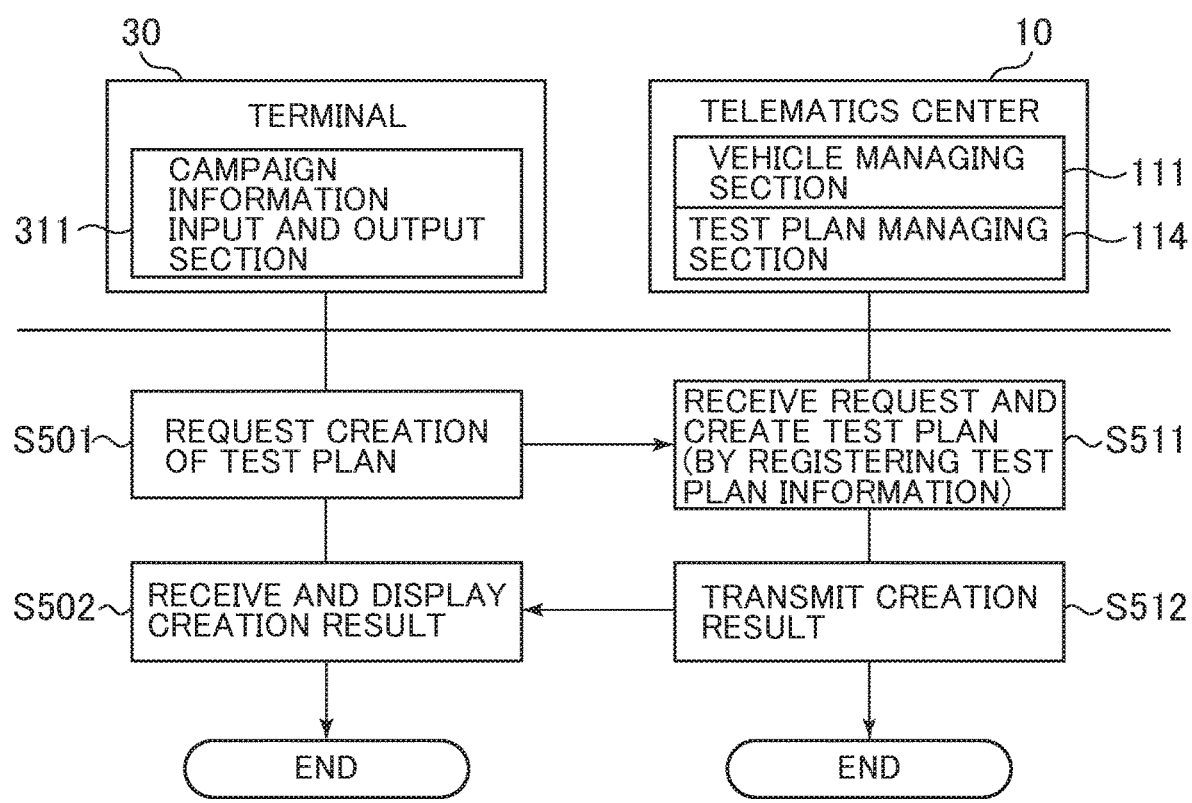
FIG. 13 is a sequence diagram depicting an example of a procedure for a process of creating a test plan.

FIG. 13 is a sequence diagram depicting an example of a procedure for a process of creating a test plan. A process depicted in FIG. 13 is to create a new test plan by registering test plan information.

In FIG. 13, the terminal 30 requests the creation of the test plan. In the second embodiment, however, the navigation terminal 230 of the vehicle 20 may request the creation of the test plan, instead of the terminal 30. In this case, instead of the campaign information input and output section 311 depicted in FIG. 13, the update information display section 232 of the navigation terminal 230 may execute the same processes as those to be executed by the campaign information input and output section 311.

In FIG. 13, first, an engineer or the like who makes the test plan operates the input and output device 330 of the terminal 30 and enters detailed information (corresponding to test plan information 1250) necessary for the test plan to be registered. Although a specific example is omitted, a predetermined test plan creation screen that is similar to the campaign creation screen (refer to FIG. 9) described in the first embodiment may be displayed by the input and output device 330.

In step S501, the campaign information input and output section 311 of the terminal 30 requests the telematics center 10 to create a new test plan in response to the aforementioned entry operation. In this case, the detailed information, entered by the entry operation, of the test plan is transmitted to the telematics center 10.

The telematics center 10 receives the request provided in step S501, and the campaign managing section 112 (or the vehicle managing section 111) registers the requested test plan information by causing the received detailed information of the test plan to be stored as test plan information 1250 in the test plan DB 125 (in step S511). Then, in step S512, the campaign managing section 112 (or the vehicle managing section 111) transmits, to the terminal 30, a result (or a result of creating the test plan) of registering the test plan information 1250 in step S511.

In the aforementioned step S511, it is preferable to confirm that the test plan information requested to be registered does not include a defect and to register the test plan information 1250. For example, whether information corresponding to a specified test vehicle VIN, a specified ECU-ID, and a specified software ID is stored in the DBs of the storage device 120 is confirmed. Then, when the information is not stored as a result of the confirmation, the test plan information 1250 is not registered in step S511 and a creation result indicating that the test plan is not created in step S512 is transmitted.

When the test plan information is requested to be registered, the campaign managing section 112 executes the inappropriate probability determination process (refer to FIGS. 7 and 8) to determine whether an updated amount of update software specified in the current test plan information is not significantly different from an updated amount of the update software in a past test plan, like the case where campaign information is requested to be registered in the first embodiment. To supplement this, "campaign" depicted in FIG. 8 may be replaced with "test plan". In this case, when the campaign managing section 112 determines that the updated amount of the update software specified in the current test plan is significantly different from past histories in the inappropriateness probability determination process (the answer to the determination of step S226 depicted in FIG. 8 corresponds YES), the test plan information is not registered (or the test plan is not created), the alert message is prepared and transmitted as a creation result in step S512. By executing the inappropriateness probability determination process, an effect of preventing inappropriate software from being selected can be expected in the creation of a test plan.

Upon receiving the test plan creation result transmitted in step S512, the campaign information input and output section 311 of the terminal 30 causes the input and output device 330 to display the received test plan creation result (in step S502). By executing this, the operator such as the engineer can confirm the creation result of the requested test plan.

(2-2-2) Distribution of Update Software

Figure 14:
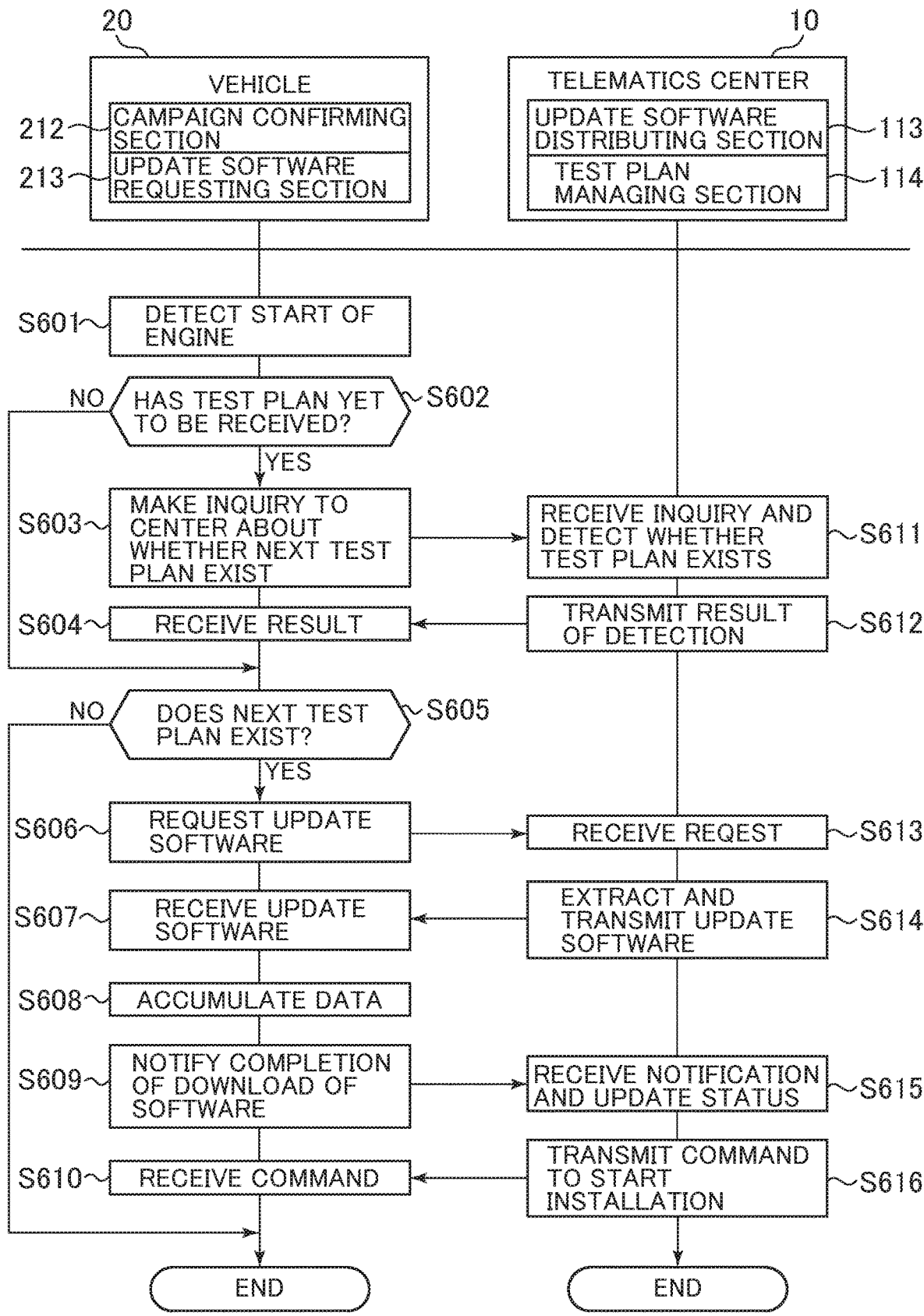
FIG. 14 is a first sequence diagram depicting an example of a procedure for a process of distributing update software based on the test plan.
Figure 15:
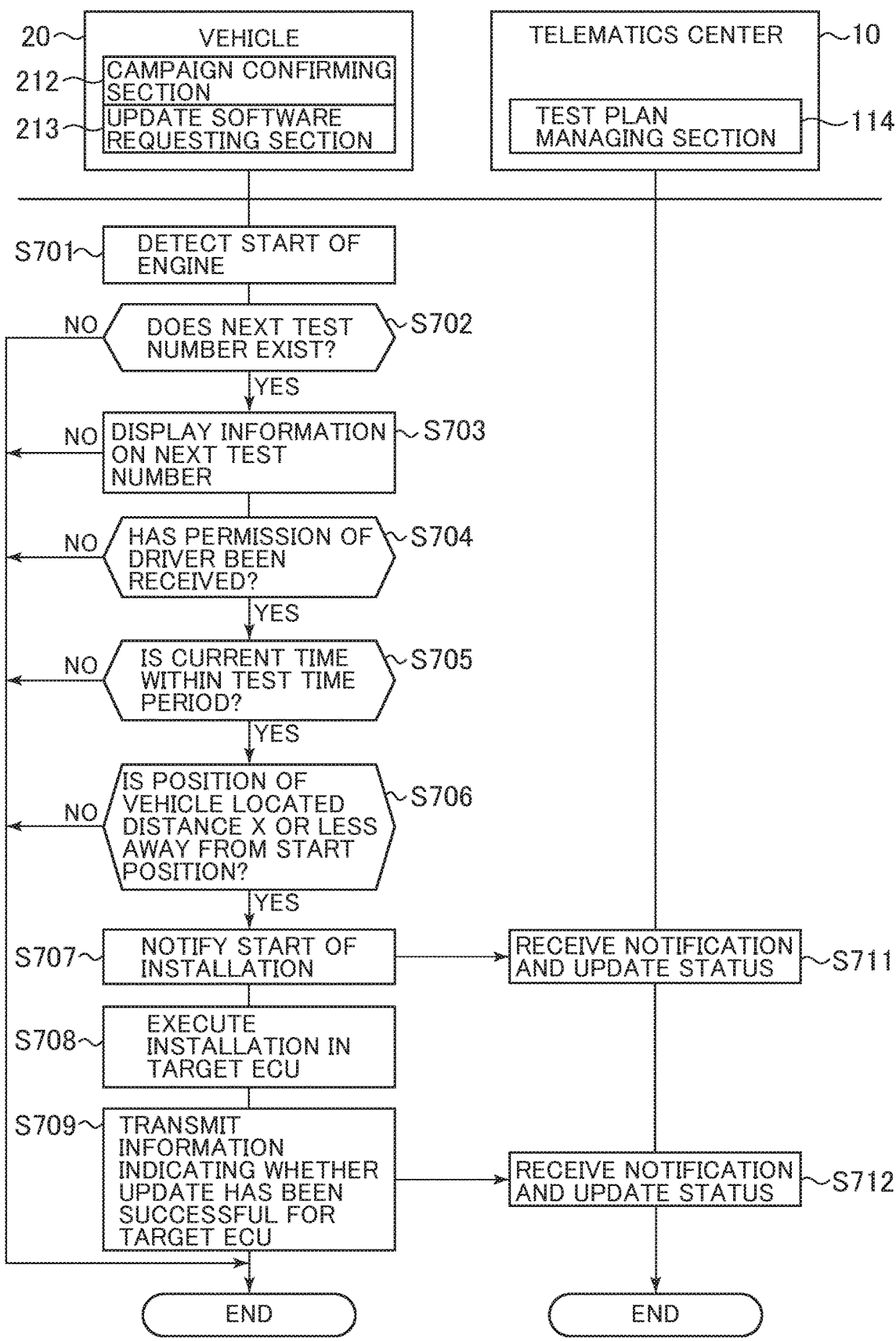
FIG. 15 is a second sequence diagram depicting the example of the procedure for the process of distributing the update software based on the test plan.
Figure 16:
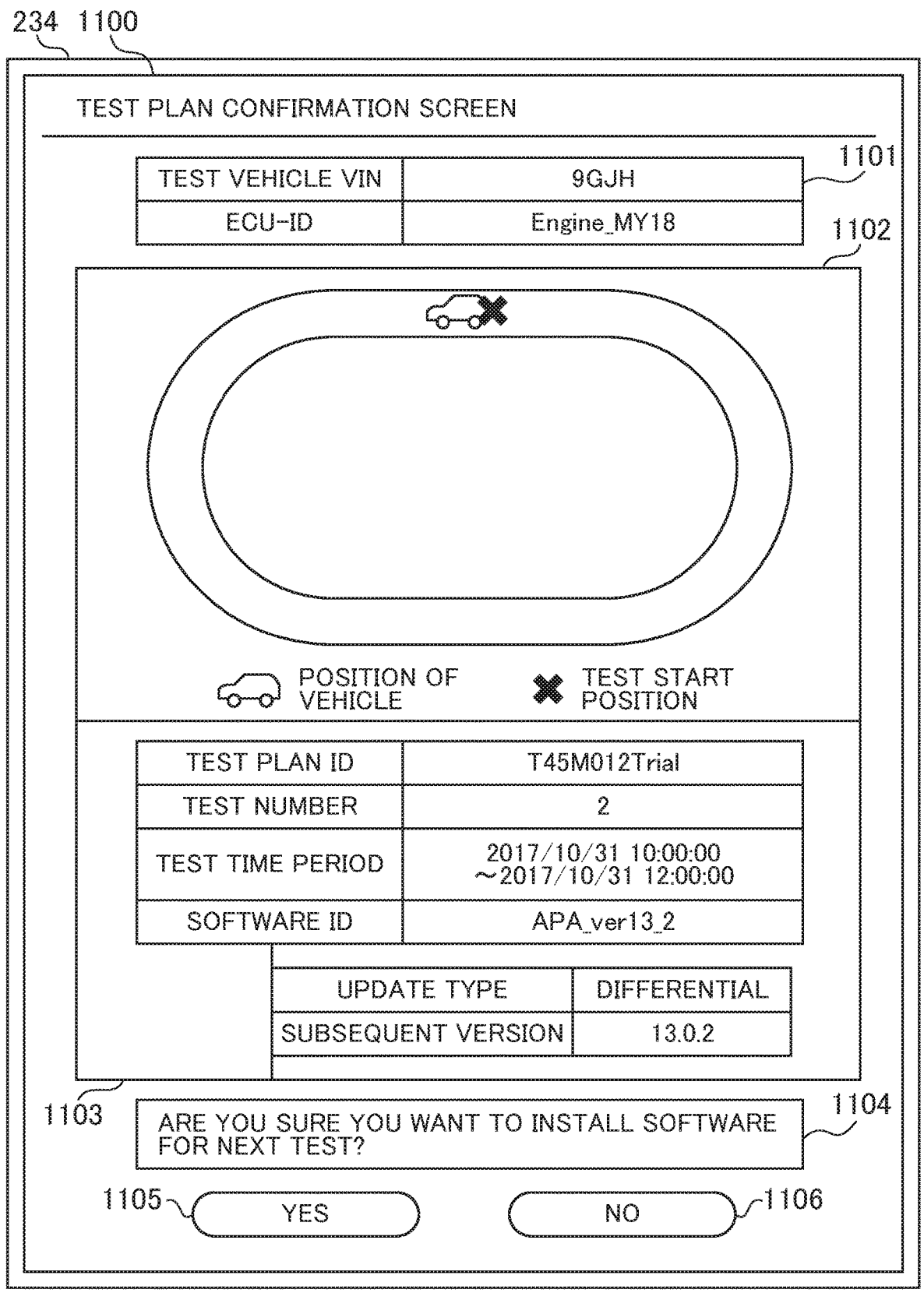
FIG. 16 is a diagram describing an example of a test plan confirmation screen.

FIGS. 14 and 15 are first and second sequence diagrams depicting an example of a procedure for a process of distributing update software based on a test plan. FIG. 14 depicts a process of downloading update software by the vehicle 20 (test vehicle) used in a test from the telematics center 10. FIG. 15 depicts a process of installing the update software by the vehicle 20 (test vehicle) in a target ECU after the download depicted in FIG. 14 and notifying a result of the installation to the telematics center 10. FIG. 16 is a diagram describing an example of a test plan confirmation screen.

First, the process of downloading the update software based on a created test plan is described with reference to FIG. 14. The process depicted in FIG. 14 is executed by the campaign confirming section 212 and update software requesting section 213 of the software update device 210 installed in the vehicle 20 and the update software distributing section 113 and the test plan managing section 114 of the arithmetic processing device 110 installed in the telematics center 10.

In FIG. 14, first, the campaign confirming section 212 of the vehicle 20 uses information obtained from the engine ECU 241 to detect the start of the engine of the vehicle 20 (in step S601). Upon detecting the start of the engine in step S601, the campaign confirming section 212 confirms whether the test plan has yet to be received from the telematics center 10 (in step S602).

When the test plan has not yet to be received (YES in step S602), the campaign confirming section 212 makes an inquiry to the telematics center 10 about whether a test plan for the concerned vehicle 20 exists (in step S603). On the other hand, when the test plan has been received (NO in step S602), processes of steps S603 and S604 are skipped and the process proceeds to step S605.

The telematics center 10 receives the inquiry provided in step S603, and the test plan managing section 114 searches for test plan information 1250 stored in the test plan DB 125, confirms whether a record in which a test vehicle VIN 1256 matches the VIN of the source vehicle 20 exists, and detects whether the test plan exists (in step S611). Then, the test plan managing section 114 transmits a result (detection result) of the confirmation executed in step S611 to the vehicle 20 (in step S612). Specifically, when the record in which the test vehicle VIN 1256 matches the VIN of the source vehicle 20 exists in step S611, the test plan managing section 114 transmits test plan information 1250 of the record as the detection result. When the record in which the test vehicle VIN 1256 matches the VIN of the source vehicle 20 does not exist in step 611, the test plan managing section 114 transmits information indicating that the test plan does not exist as the detection result.

The vehicle 20 receives the detection result from the telematics center 10 (in step S604), and the campaign confirming section 212 confirms whether a next test number exists based on the detection result (in step S605). Specifically, the campaign confirming section 212 references consecutive test numbers 1252 and statuses 1253 of the received test plan information 1250 (including the detection result received in step S604). When a test number associated with a status indicating "not distributed" exists, the campaign confirming section 212 determines that the next test number exists (YES in step S605) and the process proceeds to step S606. In the determination of the next test number, whether current time is close to a date and time that are described in a test start date and time 1254 may be determined. When the test number associated with the status indicating "not distributed" does not exist or when the received test plan information 1250 does not exist, the campaign confirming section 212 determines that the next test number does not exist (NO in step S605). In this case, the update software is not distributed in accordance with the test plan and the process is terminated.

The update software requesting section 213 requests the telematics center 10 to provide update software associated with the next test number and identified by a software ID 1258 included in the record of the test plan information 1250 (in step S606). In the following description, the aforementioned received test plan is referred to as "execution test plan".

When the telematics center 10 receives the request provided in step S606 (in step S613), the update software distributing section 113 extracts the requested update software (update software based on the execution test plan) from the software DB 124 based on the specified software ID 1258 and transmits the extracted update software to the vehicle 20 (in step S614).

The update software transmitted in step S614 is received by the vehicle 20 and starts to be downloaded (in step S607), and data of the downloaded update software is accumulated in the storage device 215 (in step S608). When the download of the update software is completed, the campaign confirming section 212 notifies the completion of the download to the telematics center 10 (in step S609).

When the telematics center 10 receives (accepts) the download completion notification provided in step S609, the test plan managing section 114 updates a status 1253 of the test plan information 1250 of the execution test plan to "download completed" and rewrites the updated status 1253 to the test plan DB 125 (in step S615). After that, the test plan managing section 114 transmits, to the vehicle 20, a command to start the installation of the update software transmitted in step S614 (in step S616).

When the vehicle 20 receives (accepts) the command, transmitted in step S616, to start to the installation of the update software (in step S610), the campaign confirming section 212 of the vehicle 20 transitions to a standby state to wait for the start of the installation of the update software until the engine of the vehicle 20 is stopped (OFF state). The campaign confirming section 212 may use information obtained from the engine ECU 241 to detect the stop of the engine. A process to be executed after the stop of the engine is depicted in FIG. 15.

Update software is distributed before each of tests indicated by consecutive test numbers as described above. As another example of the process, however, update software may be distributed (downloaded) in units of test plans.

In this case, in the process depicted in FIG. 14, whether the next test number exists is not determined in step S605 described above, but whether the test plan information 1250 has been received is determined in step S604. Only when the test plan information 1250 is received from the telematics center 10, the process proceeds to step S606, and request is performed to provide update software (all update software identified by software IDs 1258 specified in records including the same test plan ID 1251) to be distributed in the test plan to the telematics center 10.

As described above, when all update software of multiple versions is collectively downloaded in units of test plans, the software can be quickly installed at appropriate time after the download, and an effect of reducing a time period for preparing a test can be expected. For example, it is possible to suppress a time period for waiting for the completion of download by downloading software during test traveling and to quickly start the installation of next software upon the stop of a test vehicle (or upon the stop of an engine of the test vehicle).

Next, a process of installing update software based on a test plan is described with reference to FIG. 15. The process depicted in FIG. 15 is executed by the campaign confirming section 212 and ECU software updating section 214 of the software update device 210 installed in the vehicle 20 and the test plan managing section 114 of the arithmetic processing device 110 installed in the telematics center 10.

In FIG. 15, first, the campaign confirming section 212 of the vehicle 20 uses information obtained from the engine ECU 241 to detect the stop of the engine (in step S701).

Upon detecting the stop of the engine in step S701, the campaign confirming section 212 confirms whether a next test number exists (in step S702). For example, the campaign confirming section 212 references test plan information 1250 of a current test plan and confirms whether a next test number 1252 exists. When the next test number does not exist (NO in step S702), update software to be installed does not exist and the process is terminated.

On the other hand, when the next test number exists (YES in step S702), the campaign confirming section 212 causes the input and output device 234 to display information on a next test (in step S703).

A display screen of the input and output device 234 is described below. In step S703, the input and output device 234 displays a "test plan confirmation screen" exemplified in FIG. 16 for the purpose of displaying information for an operator (for example, a driver) in step S703.

In FIG. 16, the test plan confirmation screen 1100 is displayed by the input and output device 234 and includes display regions 1101, 1102, 1103, and 1104 in this order from the top of the screen and includes buttons 1105 and 1106 under the display region 1104.

The display regions 1101 to 1103 are provided to display information on a test plan and the like. Information described in the test plan information 1250 is mainly displayed on the display regions 1101 to 1103.

Specifically, details displayed on the display region 1101 can be acquired from a test vehicle VIN 1256 and an ECU-ID 1257. Details displayed on the display region 1103 correspond to a test plan ID 1251, a test number 1252, test start date and time 1254 and test end date and time 1255 (or a test time period), a software ID 1258, and the like. An "update type" and a "subsequent version" that are associated with the software ID and displayed on the display region 1103 can be acquired by referencing the software information 1240 (stored in the software DB 124) based on a software ID "APA_ver13_2".

A position (test start position) at which a next test is started on the test course and a current position (vehicle position) of the test vehicle are indicated in the display region 1102. The test start position can be acquired from a test start position 1259 of the test plan information 1250. The vehicle position can be acquired from a position 1213 of the vehicle information 1210 stored in the vehicle DB 121. The operator such as the driver can simply recognize a current state by visualizing not only numerical data but also such information as indicated in the display region 1102 depicted in FIG. 16.

A message that requests the operator (for example, the driver) to give a permission for the installation of update software is displayed on the display region 1104. As an answer to the message, the driver selects the button 1105 indicating "YES" or the button 1106 indicating "NO", thereby giving a permission or non-permission for the installation of the update software. A message able to be displayed on the display region 1104 is not limited to the exemplary message depicted in FIG. 16. For example, when the download of update software to be distributed in a next test is not completed, a message indicating that "Please wait until the download is completed" or the like may be displayed on the display region 1104.

Return to the description of FIG. 15. After the test plan confirmation screen is displayed in step S703, the campaign confirming section 212 determines whether the permission of the driver has been obtained (in step S704). Specifically, when the button 1105 of the test plan confirmation screen 1100 is selected, the campaign confirming section 212 determines that the permission for the start of the installation of the update software for the next test has been obtained (YES in step S704), and the process proceeds to step S705. On the other hand, when the button 1106 of the test plan confirmation screen 1100 is selected, the campaign confirming section 212 determines that the permission of the driver has not been obtained (NO in step S704), and the process is terminated.

In step S706, the campaign confirming section 212 confirms whether the current position of the concerned vehicle 20 (test vehicle) is located in a distance X from the test start position. The "distance X" defines a predetermined acceptable range from a start position strictly specified by a test start position 1259 of test plan information 1250. An appropriate distance is set as the distance X in advance. When the current position of the concerned vehicle 20 is located exceeding the distance X from the test start position (NO in step S706), the vehicle 20 is not at a position where the installation of the update software can be started, and the process is terminated. On the other hand, when the current position of the concerned vehicle 20 is located within the distance X from the test start position (YES in step S706), the process proceeds to step S707.

In step S707, the campaign confirming section 212 notifies the start of the installation of the update software in a target ECU to the telematics center 10. The telematics center 10 receives the installation start notification provided in step S707, and the test plan managing section 114 updates a status 1253 of the test plan information 1250 of the execution test plan to "installing" and rewrites the updated status 1253 to the test plan DB 125 (in step S711).

In the vehicle 20 that has transmitted the installation start notification, the ECU software updating section 214 executes the installation of the software in the target ECU and rewrites the storage device of the ECU (in step S708). After that, the ECU software updating section 214 receives the installation result (information indicating whether the update has been successful) from the target ECU and notifies the telematics center 10 of the received information indicating whether the update has been successful (in step S709).

When the telematics center 10 receives the notification provided in step S709, the test plan managing section 114 updates the status 1253 of the test plan information 1250 of the execution test plan to "completed" and rewrites the updated status 1253 to the test plan DB 125 (in step S712).

By normally executing the processes depicted in FIGS. 14 and 15, the software distribution system 1 according to the second embodiment completes the distribution (download and installation) of the update software in accordance with the test plan, thereby preparing for the execution of a next test in the test plan.

As described above, the software distribution system 1 according to the second embodiment can use more detailed information (test plan information) than a normal campaign to manage the distribution of update software to an in-vehicle device for a test plan in which the distribution of the update software is to be executed multiple times.

For a test course on which such a test plan described above is conducted or the like, a test time period has been limited and test staff (or a driver or the like) with no expertise in software has needed to install update software in a test vehicle based on the progress of the test plan. For the problems, the software distribution system 1 according to the second embodiment gives the following effects.

First, in the second embodiment, a test plan is created before the start of a test, and software to be updated in accordance with the test plan can be collectively specified and registered (refer to FIG. 13). An operation related to the generation of the test plan can be performed by an engineer with expertise or the like before the test is conducted on the test course. Thus, an effect of preventing an operational error caused by test staff can be expected. In the generation of the test plan, the inappropriateness probability determination process can be executed, like the generation of a campaign in the first embodiment. In this case, it can be expected to prevent inappropriate software from being selected by the engineer or the like.

Next, in the second embodiment, after the test plan is generated, update software of multiple versions can be distributed (downloaded and installed) by the simple operations on the test course on which the test is actually conducted (refer to FIGS. 14 and 15).

For example, as depicted in FIG. 14, the update software can be downloaded in accordance with the test plan by automatically searching for the test plan in response to the start of the engine of the test vehicle (vehicle 20) (in steps S602 to S604, S611, and S612). When a next test number exists, the update software can be automatically downloaded (in steps S606 to S609 and S613 to S615). By executing the process, update software for a next test can be downloaded during test traveling without requesting test staff (for example, a driver) to make a special determination, and it is possible to suppress a human-caused error.

For example, as depicted in FIG. 15, when information on a next test is displayed on the test plan confirmation screen (refer to FIG. 16) for the installation of update software in a test plan in response to the stop of the engine of the test vehicle (vehicle 20). When a requirement for the installation is satisfied and test staff (for example, a driver) confirms the screen and selects the button 1105 indicating "YES", the installation of next update software is immediately started. Specifically, the software for the next test can be updated even when a person who is not an engineer with expertise performs a simple operation (of only selecting "YES" or "NO") while watching the test plan confirmation screen displayed based on the progress of the test plan on the test course, and it is possible to suppress a human-caused error.

As described above, in the second embodiment, software of multiple types or versions can be distributed by a simple operation on the test course or the like while a human-caused error is suppressed. Thus, it can be expected to prevent settings from being reconfigured due to an operational error and provide an effect of reducing a time period required for preparation for a next test.

In the second embodiment, a campaign other than a campaign based on a test plan is treated in the same manner as the first embodiment. Thus, only when it is determined that there is no probability that inappropriate update software has been selected in accordance with a request to create a new campaign, campaign information 1230 is created and registered and the new campaign is created, like the first embodiment. When it is determined that there is a probability that inappropriate update software has been selected, whether specified software is appropriate can be confirmed and examined by displaying the alert message (in the display region 1003) on the campaign creation screen 1000. The software distribution system 1 according to the second embodiment can prevent inappropriate update software from being distributed due to a human-caused error on a campaign.

(3) Others

The invention that is described in the first and second embodiments is applicable to not only a design and development process or a phase before sales but also Field Over The Air (OTA) after a vehicle is sold. For example, when a user of the vehicle selects and purchases software for the purpose of adding a function or turning the vehicle, update software may be distributed based on a campaign. By applying the invention to the campaign, an effect of suppressing selection of inappropriate software or selection of software that is not originally intended by an operator upon the creation of the campaign is obtained.

In addition, the invention is not limited to the aforementioned embodiments and includes various modified examples. For example, the embodiments are described in detail to clearly explain the invention and may not include all the aforementioned configurations. Furthermore, one or more of the configurations described in the embodiments may be added to, removed from, or replaced with one or more of the configurations described in the embodiments. For example, the telematics center 10 that is the software distribution server may include an input and output device having a display function, and the input and output device of the telematics center 10 may display the same screens (campaign creation screen and test plan confirmation screen) as those of the input and output device 330 of the terminal 30 and the input and output device 234 of the vehicle 20 (or the navigation terminal 230).

Some or all of the aforementioned configurations, functions, processing sections, processing units, and the like may be enabled by hardware by designing an integrated circuit. In addition, the aforementioned configurations, functions, and the like may be enabled by software by causing a processor to interpret and execute a program for enabling the functions. Information of the program for enabling the functions, the tables, files, and the like may be stored in a storage device such as a memory, a hard disk, or a solid state drive (SSD), or a storage medium such as an IC card, an SD card, or a DVD. In addition, control lines and information lines considered to be necessary for the description are depicted. Not all control lines and information lines in a product are necessarily depicted. Almost all the configurations may be considered to be connected to each other in practice.

What is claimed is:

1. A software distribution system that controls an update of a function for an in-vehicle device of a vehicle, comprising: a software distribution server that uses a campaign to manage the update of the function and remotely distributes software based on the campaign to a target vehicle for the campaign; a terminal that receives an operation by an operator and executes input and output from and to the software distribution server; and a software update device that is attached to the vehicle and configured to download the software distributed by the software distribution server and install the software in the target in-vehicle device, wherein the software distribution server includes: a storage section that stores various types of information including the software; a campaign managing section that receives information necessary for the campaign from the terminal and creates the campaign by registering campaign information constituted by the received information in the storage section; and a software distributing section that remotely distributes the software based on the campaign to the target vehicle for the campaign in accordance with the campaign information registered in the campaign managing section, wherein when the creation of the campaign is requested by the operation of the terminal, the campaign managing section compares statistical information of updated amounts of the software based on a plurality of recent past campaigns in the in-vehicle device with an updated amount of the software based on the requested campaign, when a predetermined requirement is satisfied, the campaign managing section does not create the requested campaign, prepares a predetermined alert, and transmits the predetermined alert to the terminal, and the terminal displays the predetermined alert received from the campaign managing section on a predetermined display screen, and wherein the predetermined requirement is the updated amount of the software based on the requested campaign is two times greater than the statistical information of the updated amounts of the software.

2. The software distribution system according to claim 1, wherein the terminal displays, on the display screen on which the predetermined alert is displayed, an input section for redetermining whether the requested campaign is to be created, and wherein when the input section determines that the requested campaign is to be created, the campaign managing section creates the campaign.

3. The software distribution system according to claim 1, wherein the predetermined requirement to be used by the campaign managing section when the creation of the campaign is requested is a requirement for determining that the updated amount of the software based on the requested campaign deviates from the statistical information of the updated amounts of the software based on the plurality of recent past campaigns.

4. The software distribution system according to claim 1, wherein the updated amounts of the software is calculated based on a difference between file sizes of the software before the update and after the update, a difference between the numbers of rows of source codes of the software before the update and after the update, the amount of differential bits when the software is treated as binary files before the update and after the update, or the numbers of ROM blocks to be updated when the software before the update and after the update is written to the in-vehicle device.

5. The software distribution system according to claim 1, wherein for a test plan in which multiple campaigns are executed in a stepwise manner, the software distribution server includes a test plan managing section configured to receive information necessary for the test plan from the terminal and create the test plan by registering test plan information constituted by the received information in the storage section, wherein the software distributing section remotely distributes the software based on a plurality of campaigns included in the test plan to a target vehicle for the test plan, in accordance with the test plan information registered in the test plan managing section, and wherein the target vehicle to which the software has been distributed based on the test plan requests an operator to give a permission for the installation of the software based on the campaigns via the terminal before the execution of the campaigns included in the test plan, and when the permission is given, the software update device installs the software.

6. The software distribution system according to claim 5, wherein the test plan information includes at least information of consecutive numbers of tests in the test plan and start positions, in addition to information constituting the campaign information.

7. The software distribution system according to claim 5, wherein the terminal that requests the operator to give the permission for the installation of the software is arranged in the target vehicle to which the software is distributed.

8. The software distribution system according to claim 5, wherein the software distribution section collectively remotely distributes the software based on the plurality of campaigns included in the test plan to the target vehicle for the test plan before the start of the test plan.

9. A software distribution server that uses a campaign to manage an update of a function for an in-vehicle device of a vehicle and remotely distributes software based on the campaign to the target vehicle for the campaign, comprising:

a storage section that stores various types of information including the software;

a campaign managing section that receives information necessary for the campaign from a terminal and creates the campaign by registering campaign information constituted by the received information in the storage section; and a software distributing section that remotely distributes the software based on the campaign to the target vehicle for the campaign in accordance with the campaign information registered in the campaign managing section, wherein when the campaign managing section receives a request to create the campaign from the terminal, the campaign managing section compares statistical information of updated amounts of the software based on a plurality of recent past campaigns in the in-vehicle device with an updated amount of the software updated based on the requested campaign, and when a predetermined requirement is satisfied, the campaign managing section does not create the campaign, prepares a predetermined alert, and transmits the predetermined alert to the terminal, and wherein the predetermined requirement is the updated amount of the software based on the requested campaign is two times greater than the statistical information of the updated amounts of the software.

10. The software distribution server according to claim 9, wherein when the campaign managing section receives the request to create the campaign from the terminal, but does not create the requested campaign and transmits the predetermined alert to the terminal, and after that, receives a second instruction to create the requested campaign from the terminal, the campaign managing section creates the requested campaign.

11. The software distribution server according to claim 9, wherein the predetermined requirement to be used by the campaign managing section when the creation of the campaign is requested is a requirement for determining that the updated amount of the software updated based on the requested campaign deviates from the statistical information of the updated amounts of the software based on the plurality of recent past campaigns.

12. The software distribution server according to claim 9, wherein the updated amounts of the software is calculated based on a difference between file sizes of the software before the update and after the update, a difference between the numbers of rows of source codes of the software before the update and after the update, the amount of differential bits when the software is treated as binary files before the update and after the update, or the numbers of ROM blocks to be updated when the software before the update and after the update is written to the in-vehicle device.

13. A software distribution method to be executed by a software distribution system that controls an update of a function for an in-vehicle device of a vehicle, wherein the software distribution system includes: a software distribution server that uses a campaign to manage the update of the function and remotely distributes software based on the campaign to the target vehicle for the campaign; a terminal that receives an operation by an operator and executes input and output from and to the software distribution server; and a software update device that is attached to the vehicle and configured to download the software distributed by the software distribution server and install the downloaded software in the target in-vehicle device, wherein the software distribution server includes: a storage section that stores various types of information including the software; a campaign managing section that receives information necessary for the campaign from the terminal and creates the campaign by registering campaign information constituted by the received information in the storage section; and a software distributing section that remotely distributes the software based on the campaign to the target vehicle for the campaign in accordance with the campaign information registered in the campaign managing section, the software distribution method comprising, when the creation of the campaign is requested by the operation of the terminal, steps of: causing the campaign managing section to compare statistical information of updated amounts of the software based on a plurality of recent past campaigns in the in-vehicle with an updated amount of the software based on the requested campaign; inhibiting, when a predetermined requirement is satisfied in the comparison, the campaign managing section from creating the campaign, and causing the campaign managing section to prepare a predetermined alert and transmit the predetermined alert to the terminal; and causing, upon receiving the step of inhibiting creation of the campaign, the terminal to receive the predetermined alert from the campaign managing section and display the predetermined alert on a predetermined display screen, and wherein the predetermined requirement is the updated amount of the software based on the requested campaign is two times greater than the statistical information of the updated amounts of the software.

14. The software distribution method according to claim 13,
wherein in the step of displaying the alert, the terminal displays, on the predetermined display screen on which the predetermined alert is displayed, an input section for redetermining whether the requested campaign is to be created, and
wherein the software distribution method further comprises a step of causing the campaign managing section to create the campaign when the input section determines that the requested campaign is to be created after the step of displaying the alert.

15. The software distribution method according to claim 13,
wherein for a test plan in which multiple campaigns are executed in a stepwise manner, the software distribution server includes a test plan managing section configured to receive information necessary for the test plan from the terminal and create the test plan by registering test plan information constituted by the received information in the storage section,
wherein the software distributing section remotely distributes the software based on a plurality of campaigns included in the test plan to a target vehicle for the test plan, in accordance with the test plan information registered in the test plan managing section, and
wherein the target vehicle to which the software has been distributed based on the test plan requests an operator to give a permission for the installation of the software based on the campaigns via the terminal before the execution of the campaigns included in the test plan, and when the permission is given, the software update device installs the software.

* * * * *